(12) United States Patent
Stevenson et al.

(10) Patent No.: US 9,557,207 B2
(45) Date of Patent: Jan. 31, 2017

(54) SYSTEM AND METHOD FOR DETERMINING VOLUME OF FLUID IN A TANK

(71) Applicant: S1 Technologies, Inc., Scottsdale, AZ (US)

(72) Inventors: David L. Stevenson, Diana, TX (US); Sarah Bones, Gilbert, AZ (US)

(73) Assignee: S1 Technologies, Inc., Gilmer, TX (US)

( * ) Notice: Subject to any disclaimer, the term of this patent is extended or adjusted under 35 U.S.C. 154(b) by 0 days.

(21) Appl. No.: 14/529,118

(22) Filed: Oct. 30, 2014

(65) Prior Publication Data

US 2015/0120515 A1    Apr. 30, 2015

Related U.S. Application Data

(60) Provisional application No. 61/897,426, filed on Oct. 30, 2013.

(51) Int. Cl.
*G01F 17/00* (2006.01)
*G01F 23/14* (2006.01)
(Continued)

(52) U.S. Cl.
CPC .............. *G01F 23/14* (2013.01); *G01F 22/02* (2013.01); *G06Q 10/087* (2013.01);
(Continued)

(58) Field of Classification Search
CPC ........ G01F 23/14; G01F 23/162; G01F 23/18; G01F 1/007; G01F 22/00; G01F 23/268; G01F 25/0061; G01F 25/00; G01F 13/006; G06Q 20/3224; G06Q 20/342; G06Q 20/405; G06Q 10/06; G06Q 20/4016; G06Q 20/40; F02D 2200/0602; F02D 2200/0606; F02D 19/0628; F02D 2200/0611; F02D 45/00
See application file for complete search history.

(56) References Cited

U.S. PATENT DOCUMENTS 4,296,472 A * 10/1981 Sarkis .................... G01F 1/007
    701/123
4,570,484 A * 2/1986 Sokalski ................ G01F 23/14
    137/392

(Continued)

FOREIGN PATENT DOCUMENTS

CA    2753588 A1 * 3/2013 ............. G01F 23/30
WO    2013/140375 A2   9/2013

OTHER PUBLICATIONS www.cagi.org/files/pressure_volume_calculator_02.xls.*
(Continued)

*Primary Examiner* — Ryan Zeender
*Assistant Examiner* — Dana Amsdell
(74) *Attorney, Agent, or Firm* — Jack D. Stone, Jr., Esq.; Scheef & Stone, L.L.P.

(57) ABSTRACT

Volume of a fluid in a tank is determined by measuring the pressure of fluid proximate to the bottom of the tank. The depth of the fluid is then determined from the pressure and density of the fluid. Fluid volume is then determined mathematically or from charts given the depth as well as the size and shape of a tank. Multiple pressure readings may be taken along the bottom of a tank, and an average pressure determined that may be used to calculate volume. Pressure readings may be taken at different heights to determine fluid density used to calculate volume. Pressure readings may be adjusted for atmospheric pressure. Volume increases or decreases exceeding a respective predetermined threshold may be flagged and alerts generated. Volume calculations may be recorded for comparing against a volume of fluid recorded as being purchased.

30 Claims, 25 Drawing Sheets

(51) Int. Cl.

| | | |
|---|---|---|
| *G06Q 10/08* | (2012.01) | |
| *G08B 19/02* | (2006.01) | |
| *G06Q 20/08* | (2012.01) | |
| *G06Q 20/40* | (2012.01) | |
| *G07C 5/00* | (2006.01) | |
| *G07F 13/02* | (2006.01) | |
| *G01F 22/02* | (2006.01) | |
| *G01F 1/00* | (2006.01) | |
| *G01F 1/37* | (2006.01) | |
| *G01F 1/68* | (2006.01) | |
| *G01L 27/00* | (2006.01) | |
| *G06Q 40/00* | (2012.01) | |
| *G07C 5/08* | (2006.01) | |

(52) U.S. Cl.
CPC ....... *G06Q 20/085* (2013.01); *G06Q 20/4016* (2013.01); *G07C 5/008* (2013.01); *G07F 13/025* (2013.01); *G08B 19/02* (2013.01); *G07C 5/085* (2013.01)

(56) References Cited

U.S. PATENT DOCUMENTS

| | | | | |
|---|---|---|---|---|
| 4,625,548 | A * | 12/1986 | Charter | G01F 23/16 73/299 |
| 4,843,883 | A * | 7/1989 | Glover | G01F 23/18 338/42 |
| 5,167,155 | A * | 12/1992 | Rodgers | G01F 23/162 73/290 R |
| 5,303,842 | A | 4/1994 | Harp et al. | |
| 5,333,498 | A * | 8/1994 | Brackett | B67D 7/08 73/198 |
| 5,665,895 | A * | 9/1997 | Hart | G01F 1/007 702/100 |
| 5,701,863 | A | 12/1997 | Cemenska et al. | |
| 5,829,418 | A * | 11/1998 | Tamura et al. | 123/529 |
| 6,003,379 | A * | 12/1999 | Ichikawa | G01L 19/0092 73/708 |
| 6,282,953 | B1 * | 9/2001 | Benjey | B60K 15/077 73/1.32 |
| 6,463,389 | B1 | 10/2002 | Dickson | |
| 6,568,424 | B1 | 5/2003 | Galad et al. | |
| 6,618,362 | B1 | 9/2003 | Terranova | |
| 6,907,780 | B1 * | 6/2005 | Meagher | G01F 23/18 73/292 |
| 6,935,191 | B2 | 8/2005 | Olivier et al. | |
| 7,028,561 | B2 | 4/2006 | Robertson et al. | |
| 7,689,371 | B2 | 3/2010 | Memmott et al. | |
| 8,370,088 | B2 * | 2/2013 | Ammouri | F17C 13/021 702/156 |
| 2002/0184942 | A1 | 12/2002 | Isobe | F02M 25/0809 73/114.41 |
| 2004/0023087 | A1 * | 2/2004 | Redmond | B82Y 30/00 429/515 |
| 2004/0089371 | A1 * | 5/2004 | Few | F01M 11/04 141/98 |
| 2005/0096836 | A1 | 5/2005 | Minami et al. | |
| 2005/0224055 | A1 * | 10/2005 | Wiese | F02D 41/0025 123/494 |
| 2005/0273218 | A1 * | 12/2005 | Breed | B60C 11/24 701/2 |
| 2006/0065324 | A1 | 3/2006 | Ferreira et al. | |
| 2006/0111851 | A1 | 5/2006 | Potgieter et al. | |
| 2006/0266111 | A1 * | 11/2006 | Gourlay et al. | 73/299 |
| 2007/0250452 | A1 | 10/2007 | Leigh et al. | |
| 2007/0251509 | A1 * | 11/2007 | Nakano | F02D 41/0045 123/519 |
| 2008/0209990 | A1 * | 9/2008 | Hanari | F02D 41/042 73/114.38 |
| 2008/0213874 | A1 * | 9/2008 | Mitchell | G01F 23/14 435/287.1 |
| 2008/0271516 | A1 * | 11/2008 | Hewitt | G01F 23/164 73/1.73 |
| 2008/0303663 | A1 * | 12/2008 | Smith | G08B 13/19608 340/550 |
| 2008/0319605 | A1 | 12/2008 | Davis | |
| 2010/0205072 | A1 | 8/2010 | Dixon et al. | |
| 2011/0056274 | A1 * | 3/2011 | Bunod | G01M 3/229 73/40 |
| 2011/0140877 | A1 | 6/2011 | Gilchrist et al. | |
| 2012/0156579 | A1 * | 6/2012 | Yabutani | H01M 8/04373 429/423 |
| 2012/0232750 | A1 * | 9/2012 | Leigh | G06Q 10/06 701/36 |
| 2012/0296549 | A1 | 11/2012 | Adams | |
| 2013/0197777 | A1 * | 8/2013 | Sloan | G01F 23/18 701/102 |
| 2013/0220013 | A1 * | 8/2013 | Fitz | G01F 23/26 73/304 R |
| 2013/0297178 | A1 * | 11/2013 | Hill | F02D 41/00 701/102 |
| 2013/0306656 | A1 * | 11/2013 | Eckhoff | F25D 3/125 220/592.26 |
| 2014/0129426 | A1 * | 5/2014 | Lamb | G06Q 20/342 705/39 |
| 2014/0196537 | A1 * | 7/2014 | Park | G01F 23/16 73/299 |
| 2014/0223992 | A1 * | 8/2014 | Harper | G01F 23/30 73/23.31 |
| 2014/0236444 | A1 | 8/2014 | Stefan et al. | |
| 2014/0263629 | A1 | 9/2014 | McQuade et al. | |
| 2014/0279535 | A1 | 9/2014 | Fadler | |
| 2015/0082877 | A1 * | 3/2015 | Weil | G01F 22/00 73/149 |

OTHER PUBLICATIONS www.chm.davidson.edu/vce/gaslaws/boyleslawcalc.html.*
www.calculatoredge.com/chemical/combined%20gas%20law.htm.*
Artificial Intelligent Smart and Multi Detection System for Leakage Detection of Landfill, Lagoon, Pond, Lake, and Storage Tank (0711). Retrieved from http://dialog.proquest.com/professional/docview/1189717739?accountid=161361.*

* cited by examiner

FIG. 8 239

EVENT DETAILS
REVIEW DETAILS OF THE FUELING EVENT AND TRACK NOTES RELATED TO THE EVENT

ID: 10360  UNIT: 243  DATE: 2014-09-28  TIME: 09:34:00
DRIVER:
CARD: **  ** 4415  CITY: DALLAS  ST: TX  PPG: 3.20
TEMP1: 36  TEMP2: 37  TIMEZONE: 46060  DRIVER_NAME:  AMOUNT: 572.90  REEFERGALLONS: 0
LOCATION: LOVE'S #294  INV:  DRIVER_FIRSTNAME: JOHN  CASH ADVANCE: 0
DRIVER_LASTNAME: DOE
GALLONS: 151.20  LOGVAL: 153.44  DIFFERENCE: 2.24
REVIEWEDBY:
REVIEWDATE:
STATUS: PROCESSING ▼
NOTES:

EXPORT AND SHARE
SELECT A REPORT TYPE BELOW TO DOWNLOAD AND SAVE THE EVENT DETAILS OR ENTER AN EMAIL ADDRESS BELOW TO SEND AND SHARE.

EMAIL ADDRESS
SEND TO MULTIPLE ADDRESSES BY SEPARATING THEM WITH COMMAS.  EMAIL

SAVE  PRINT  UPDATE  CANCEL

DASHBOARD | LOG OUT
REPORTS ▼ | CONFIGURE ▼ | LOGS ▼ | HELP ▼

FIG. 9  240

USER ACCESS CONFIGURATION
ADMINISTER USER ACCESS RIGHTS AND CREDENTIALS.

CREATE NEW USER

| USERNAME | FULL NAME | EMAIL | ACCESS GROUP | LAST LOGIN DATA |
|---|---|---|---|---|
| JDOE | JOHN DOE | john@gmail.com | SYSTEMADMIN | 2014-10-15 15:17:52 |
| MJOPLIN | MIKE JOPLIN | mike@gmail.com | SYSTEMADMIN | 2014-10-17 07:49:51 |
| BBROWN | BILL BROWN | bill@gmail.com | SYSTEMADMIN | 2014-10-15 15:13:12 |
| TSMITH | TREVOR SMITH | trevor@gmail.com | SYSTEMADMIN | 2014-07-07 13:04:38 |
| TJONES | TOM JONES | tom@gmail.com | VIEWER | 0000-00-00 00:00:00 |
| SSCOTT | SUE SCOTT | sue@gmail.com | SYSTEMADMIN | 2014-10-16 22:56:04 |
| KTURNER | KELLY TURNER | kelly@gmail.com | VIEWER | 2014-09-25 18:22:30 |
| DWEST | DAVID WEST | david@gmail.com | VIEWER | 2014-10-16 18:24:50 |

EXPORT AND SHARE
SELECT A REPORT TYPE BELOW TO DOWNLOAD AND SAVE THE REPORT
OR ENTER AN EMAIL ADDRESS BELOW TO SEND AND SHARE.

[SAVE] [PRINT]

EMAIL ADDRESS
SEND TO MULTIPLE ADDRESSES BY SEPARATING THEM WITH COMMAS.

[EMAIL]

FIG. 10

FUEL PURCHASE RECONCILIATIONS REPORT
VIEW ALL FUELING EVENTS RECORDED FOR TODAY, OR SEARCH FOR A SPECIFIED DATE RANGE.
DATE RANGE: 09/17/2014 - 10/17/2014

| DATE | TIME | UNIT | DRIVER NAME | CARD # | INVOICE # | FUEL LOCATION | CITY | ST | GALS PURCH | RETAIL PPG | PURCH AMOUNT | GALLONS LOGGED | DIFF |
|---|---|---|---|---|---|---|---|---|---|---|---|---|---|
| 2014-09-17 | 22:38 | 244 | | **__**_4431 | 728553 | QUIK TRIP #873 | FT. WORTH | TX | 169.18 | 3.45 | 583.49 | 156.38 | -12.80 |
| 2014-09-17 | 11:02 | 195 | | **__**_4480 | 561268 | LOVES #273 | WEATHERFORD | TX | 113.88 | 3.26 | 431.51 | 85.73 | -28.15 |
| 2014-09-17 | 9:02 | 247 | | **__**_4449 | 437473 | QUIK TRIP #970 | DALLAS | TX | 138.33 | 3.50 | 484.01 | 134.66 | -3.67 |
| 2014-09-18 | 12:20 | 195 | | **__**_4480 | 575443 | QUIK TRIP #475 | SWEETWATER | TX | 125.90 | 3.31 | 477.04 | 100.34 | -25.56 |
| 2014-09-18 | 12:59 | 243 | | **__**_4415 | 586871 | LOVES #270 | RANGER | TX | 179.10 | 3.28 | 678.62 | | -6.17 |
| 2014-09-18 | 11:12 | 246 | | **__**_4469 | 555756 | LOVES #270 | ROCKWALL | TX | 126.00 | 3.26 | 477.41 | 126.45 | 0.45 |
| 2014-09-19 | 10:34 | 241 | | **__**_4365 | 552133 | LOVES #273 | WEATHERFORD | TX | 95.00 | 3.25 | 359.98 | 80.88 | -5.12 |
| 2014-09-19 | 16:30 | 247 | | **__**_4449 | 661542 | QUIK TRIP #970 | DALLAS | TX | 140.94 | 3.40 | 479.06 | 139.00 | |
| 2014-09-20 | 7:01 | 244 | | **__**_4431 | 339807 | QUIK TRIP #970 | DALLAS | TX | 82.53 | 3.40 | 280.52 | 75.10 | -7.43 |
| 2014-09-20 | 20:37 | 243 | | **__**_4415 | 597139 | LOVES #283 | ROCKWALL | TX | 126.00 | 3.26 | 477.41 | 126.45 | 0.45 |
| 2014-09-21 | 6:31 | 195 | | **__**_4480 | 24546 | LOVES #294 | DALLAS | TX | 104.61 | 3.21 | 396.40 | 80.95 | -23.66 |
| 2014-09-21 | 11:56 | 246 | | **__**_4969 | 67624 | LOVES #283 | ROCKWALL | TX | 89.00 | 3.21 | 337.22 | 90.43 | 1.43 |

FIG. 11 244

REAL TIME FUEL INVENTORY
VIEW LATEST FUEL REPORTS FROM UNITS.

| DATE AND TIME | UNIT | GALLONS | TANK 1 TEMP | TANK 2 TEMP |
|---|---|---|---|---|
| 2014-10-17 20:48:57 | 246 | 105.71 | -6 | 81 |
| 2014-10-17 20:48:04 | 244 | 71.71 | 95 | 91 |
| 2014-10-17 20:47:58 | 195 | 188.64 | 81 | 81 |
| 2014-10-17 20:42:38 | 243 | 61.55 | 82 | 82 |
| 2014-10-17 20:42:27 | 370 | 168.57 | 84 | 77 |
| 2014-10-17 20:31:38 | 241 | 213.38 | 86 | 86 |
| 2014-10-17 20:17:05 | 242 | 100.90 | 32 | 52 |
| 2014-10-17 19:55:58 | 247 | 100.90 | 79 | 79 |
| 2014-10-17 16:39:53 | 999 | 39.58 | -22 | 70 |
| 2014-10-16 14:33:04 | 192 | 53.83 | 136 | 77 |
| 2014-09-18 10:27:44 | 190 | 19.62 | 79 | 79 |
| 2014-06-26 16:55:09 | 1234 | 0.24 | 75 | 73 |

EXPORT AND SHARE
SELECT A REPORT TYPE BELOW TO DOWNLOAD AND SAVE THE REPORT OR ENTER
AN EMAIL ADDRESS BELOW TO SEND AND SHARE.

SAVE | PRINT

EMAIL ADDRESS
SEND TO MULTIPLE ADDRESSES BY SEPARATING
THEM WITH COMMAS.

EMAIL

FIG. 12 246 →

FUEL LOSS EVENTS
VIEW LATEST FUEL LOSS EVENTS FROM UNITS.

| UNIT | DATE | TIME | GPS LAT/LON | GALLONS LOST |
|---|---|---|---|---|
| 242 | 2014-10-17 | 08:46:45 | 3129.3120,09712.3479 | -12.05 |
| 242 | 2014-10-18 | 02:13:53 | 3248.2077,09652.1291 | -12.92 |
| 244 | 2014-10-15 | 19:26:10 | 3243.2369,09720.7182 | -17.63 |
| 242 | 2014-10-15 | 08:55:22 | 3227.2461,09940.0818 | -29.68 |
| 241 | 2014-10-15 | 08:41:08 | 3248.2049,09652.1252 | -38.67 |
| 192 | 2014-10-15 | 09:02:14 | 3243.9220,09456.8701 | -28.14 |
| 242 | 2014-10-14 | 13:02:34 | 3244.1177,09719.5880 | -19.98 |
| 244 | 2014-10-14 | 08:32:39 | 2927.4390,09831.0849 | -17.53 |
| 192 | 2014-10-12 | 18:58:54 | | -28.89 |
| 195 | 2014-10-12 | 12:23:50 | 3243.9187,09456.8734 | -11.14 |
| 195 | 2014-10-11 | 15:44:45 | 3243.9181,09456.8707 | -13.75 |
| 242 | 2014-10-10 | 16:26:45 | 3240.6492,09703.4899 | -31.31 |
| 195 | 2014-10-10 | 10:56:04 | 3243.9204,09458.8292 | -11.20 |
| 192 | 2014-10-10 | 10:52:34 | | -33.68 |
| 195 | 2014-10-08 | 17:11:24 | 3227.6322,09439.7649 | -17.15 |
| 192 | 2014-10-08 | 18:48:02 | 3227.6322,09439.7649 | -36.54 |
| 195 | 2014-10-08 | 15:41:18 | 3227.6322,09439.7809 | -71.81 |
| 242 | 2014-10-06 | 08:35:08 | 3130.0999,09710.4200 | -11.33 |
| 242 | 2014-10-06 | 08:12:21 | 3130.0999,09710.4200 | -16.02 |
| 242 | 2014-10-06 | 08:35:08 | 3130.0999,09710.4200 | -11.33 |
| 242 | 2014-10-06 | 08:12:21 | 3130.0999,09710.4200 | -16.02 |
| 243 | 2014-10-02 | 16:17:36 | 3241.3317,09649.7306 | -17.83 |
| 244 | 2014-10-02 | 11:08:32 | 3241.6272,09814.8277 | -10.81 |
| 242 | 2014-09-29 | 05:54:07 | 3223.0627,09922.2520 | -19.63 |

FIG. 13 248

DAILY FUEL LOGS
VIEW ALL RAW FUEL PROBE LOGS RECORDED FOR TODAY, OR SEARCH FOR A SPECIFIED DATE RANGE.

DATE RANGE: 10/10/2014 – 10/17/2014

| DATE | TIME | UNIT | GALLONS LOGGED | TANK 1 TEMP | TANK 2 TEMP |
|---|---|---|---|---|---|
| 2014-10-10 | 02:24:16 | 244 | 1.31 | 115 | 108 |
| 2014-10-10 | 06:24:27 | 242 | 13.02 | 32 | 54 |
| 2014-10-10 | 07:36:37 | 241 | 2.30 | 111 | 115 |
| 2014-10-10 | 08:03:38 | 241 | -1.83 | 115 | 118 |
| 2014-10-10 | 09:58:55 | 242 | 10.99 | 32 | 52 |
| 2014-10-10 | 10:52:34 | 192 | -33.68 | 142 | 81 |
| 2014-10-10 | 10:07:00 | 242 | 27.32 | 32 | 52 |
| 2014-10-10 | 10:44:19 | 242 | 117.71 | 32 | 66 |
| 2014-10-10 | 10:17:59 | 244 | -3.33 | 109 | 102 |
| 2014-10-10 | 11:13:59 | 192 | 35.58 | 151 | 95 |
| 2014-10-10 | 11:22:00 | 192 | 19.99 | 156 | 100 |
| 2014-10-10 | 10:56:04 | 195 | -11.20 | 131 | 133 |
| 2014-10-10 | 11:31:03 | 243 | -3.94 | 86 | 115 |
| 2014-10-10 | 13:16:58 | 241 | 2.90 | 111 | 115 |
| 2014-10-10 | 13:57:55 | 241 | 6.60 | 108 | 109 |
| 2014-10-10 | 13:04:36 | 242 | 10.26 | 32 | 86 |
| 2014-10-10 | 13:08:27 | 242 | 10.16 | 32 | 86 |
| 2014-10-10 | 13:34:11 | 242 | 36.25 | 32 | 64 |
| 2014-10-10 | 14:57:00 | 241 | -3.47 | 117 | 122 |
| 2014-10-10 | 15:31:51 | 242 | 10.99 | 32 | 68 |
| 2014-10-10 | 16:26:46 | 242 | -31.31 | 32 | 63 |
| 2014-10-10 | 15:17:11 | 244 | 151.25 | 97 | 93 |
| 2014-10-10 | 16:12:21 | 243 | -4.92 | 118 | 122 |

FIG. 14

FUEL PURCHASE LOGS
VIEW ALL RAW FUEL PURCHASE TRANSACTION LOGS RECORDED FOR TODAY, OR SEARCH FOR A SPECIFIC DATE RANGE.

DATE RANGE: 10/10/2014 - 10/17/2014

| DATE | TIME | UNIT | INVOICE # | GALLONS PURCH | PURCH AMT | RETAIL PPG | CARD # | FUELING LOCATION | CITY | ST |
|---|---|---|---|---|---|---|---|---|---|---|
| 2014-10-10 | 8:05 | 710 | 390958 | 153.87 | 576.87 | 3.12 | **__**_4787 | LOVES #287 | VAN | TX |
| 2014-10-10 | 4:14 | 739 | 561268 | 141.51 | 530.55 | 3.13 | **__**_4712 | LOVES #450 | WEST MEMPHIS | AR |
| 2014-10-10 | 4:14 | 700 | 57667 | 100.01 | 369.95 | 3.70 | **__**_4514 | KENT TIMEOUT TR | ALAMOGORDO | NM |
| 2014-10-10 | 3:19 | 229 | 57642 | 159.03 | 546.90 | 3.16 | **__**_5123 | LOVES #254 | MOORESVILLE | IN |
| 2014-10-10 | 10:39 | 263 | 553837 | 181.08 | 675.27 | 3.16 | **__**_4829 | LOVES #307 | JACKSON | GA |
| 2014-10-10 | 1:58 | 193 | 19004 | 119.18 | 439.66 | 3.10 | **__**_4484 | LOVES #288 | FAIRFIELD | TX |
| 2014-10-10 | 17:07 | 237 | 675996 | 90.00 | 316.71 | 3.52 | **__**_4753 | WHITE OAK TRUCK | HARRISON | AR |
| 2014-10-10 | 9:28 | 747 | 496417 | 102.02 | 385.54 | 3.33 | **__**_4662 | LOVES #246 | FERNLEY | NV |
| 2014-10-10 | 6:59 | 713 | 371657 | 57.16 | 199.48 | 3.26 | **__**_5024 | LOVES #303 | WADDY | KY |
| 2014-10-10 | 15:04 | 244 | 673361 | 152.99 | 573.56 | 3.09 | **__**_4431 | LOVES #209 | GREENWOOD | LA |
| 2014-10-10 | 15:35 | 708 | 647668 | 109.30 | 376.98 | 3.14 | **__**_5198 | LOVES #222 | RICHMOND | IN |
| 2014-10-10 | 14:58 | 702 | 635487 | 137.59 | 518.22 | 3.10 | **__**_1472 | LOVES #283 | ROCKWALL | TX |

FIG. 15A 252

FUEL PROBE CONFIGURATION
SELECT A PROBE OR GROUP TO MANAGE ITS PROPERTIES, OR CONFIGURE A NEW PROBE OR GROUP.

GROUP: [ALL] ▼
PROBE: [SELECT PROBE] ▼

REPT ▼ LOGS ▼ CONFIG ▼ HELP ▼    DASHBD  LOG OUT

CONFIGURATION PROPERTIES

UNIT [ ]   GROUP [GROUP 1] ▼
PRODUCT CODE [REDACTED] ▼
IP ADDRESS [ ]
STATUS UPDATE TIME (IN HOURS) [ ]
PRESSURE STEADY COUNT [ ]
LOG TIME INTERVAL (IN SECONDS) [ ]
X CHANGE [ ]   Y CHANGE [ ]   Z CHANGE [ ]
ESTARTRIG [ ]   ESTOPTRIG [ ]   ESAMPLES [ ]
ECHANGETRIG [ ]   ESTEADYCLEAR [ ]

TANK PROPERTIES

TANK 1
TANK SIZE [ ]   PRESSURE WHEN FULL [ ]
PRESSURE PER INCH [ ]   PRESSURE ADJUST [ ]
TEMPERATURE CALIBRATION [ ]

TANK 2
TANK SIZE [ ]   PRESSURE WHEN FULL [ ]
PRESSURE PER INCH [ ]   PRESSURE ADJUST [ ]
TEMPERATURE CALIBRATION [ ]

TANK 3
TANK SIZE [ ]   PRESSURE WHEN FULL [ ]
PRESSURE PER INCH [ ]   PRESSURE ADJUST [ ]
TEMPERATURE CALIBRATION [ ]

FIG. 16A 254

FUEL PURCHASE REPORT CONFIGURATION
MANAGE HOW FUEL PURCHASE DATA IS IMPORTED TO THE APPLICATION.

SELECT REPORT

GENERAL REPORT INFORMATION

SPECIFY A NAME FOR THE REPORT. THIS WILL BE USED TO CREATE A UNIQUE FILE PATH ON THE SERVER FOR THIS REPORT TYPE.

SELECT THE TIME ZONE SETTING FOR THE PROBES.
SELECT PROBE TIMEZONE

SELECT THE TIME ZONE SETTING FOR THIS REPORT, EITHER FIXED, OFFSET OR FROM THE TIMEZONE FIELD DEFINED BELOW.
SELECT REPORT TIMEZONE

AUTOMATED DATA IMPORT
ENTER FTP INFORMATION FOR AUTOMATIC REPORT DOWNLOADING FROM THE VENDOR.

HOST
USER NAME
PASSWORD
REMOTE DIRECTORY

REPT ▼ | LOGS ▼ | CONFIG ▼ | HELP ▼
DASHBD | LOG OUT    READER

| SAVE | TEST | SCAN NOW |

MANUAL DATA UPLOAD
SELECT THE REPORT TO MANUALLY UPLOAD.
[CHOOSE FILE] NO FILE SELECTED

REPORT DATA ELEMENTS
SELECT A DATA ELEMENT TO CONFIGURE

DATA ELEMENT PROPERTIES
USE THE FIELDS BELOW TO CONFIGURE THE SELECTED DATA ELEMENT.

DATA ELEMENT NAME

DESCRIPTION

SELECT TYPE OF DATA ELEMENT
POSITION IN THE REPORT
DISPLAY IN DASHBOARD?

[ADD] [MODIFY] [DELETE]

FIG. 17A 256

FUELCHEK REPORT CONFIGURATION
CREATE, CUSTOMIZE AND MANAGE YOUR FUELCHEK REPORTING.
SELECT A REPORT: CRITICAL EVENTS - PAST WEEK

REPORT DATA ELEMENTS

SELECT WHICH DATA ELEMENTS
TO INCLUDE IN REPORT.

☑ PURCHASEID
☑ UNIT
☑ GALLONS
☑ DATE
☐ TIME
☑ DRIVER
☑ CARD
☐ CITY
☑ ST
☑ PPG
☑ LOGVAL
☑ DIFFERENCE
☐ TEMP1
☐ TEMP2
☐ TIMEZONE

REPORT PROPERTIES

REPORT NAME
CRITICAL EVENTS - PAST WEEK

DESCRIPTION OF REPORT
2ND TEST

YESTERDAY

START DATE
0000-00-00

END DATE
0000-00-00

GROUP BY
PPG

SUM FIELD

DISPLAY IN DASHBOARD: NO

GALLONS FILTER
PURCHASE GALLONS GREATER THAN:
0.00

LOG VALUE GREATER THAN:
0

DIFFERENCE GREATER THAN:
0.99

- ☐ AMOUNT
- ☑ LOCATION
- ☐ INV
- ☐ DRIVERNAME
- ☐ CASHADVANCE
- ☐ REEFERGALLONS
- ☐ DRIVER_LASTNAME
- ☐ DRIVER_FIRSTNAME
- ☐ NUMBER

REPORT SCHEDULE

EVERY DAY ▼

MON ▼

ENTER DAY OF THE MONTH TO PRODUCE REPORT (1-31)

3

ENTER TIME OF DAY TO PRODUCE REPORT (EX: 8:30AM)

08:45:00

[SAVE] [MODIFY] [DELETE] [PREVIEW]

EXPORT AND SHARE
SELECT A REPORT TYPE BELOW TO DOWNLOAD AND SAVE THE REPORT OR ENTER AN
EMAIL ADDRESS BELOW TO SEND AND SHARE.

○ 📧

[SAVE] [PRINT]

EMAIL ADDRESS _____ [EMAIL]

SEND TO MULTIPLE ADDRESSES BY SEPARATING THEM WITH COMMAS.

FIG. 18A 258

REPT ▼ LOGS ▼ CONFIG ▼ HELP ▼　　DASHBD LOG OUT

ALERTS CONFIGURATION
MANAGE REAL TIME ALERTS SENT FROM UNITS

| NAME | DESCRIPTION | TYPE | THRESHOLD | EMAIL ADDRESSES | PRODUCTS | GROUP | UNITS |
|---|---|---|---|---|---|---|---|
| ALERT 4 | LOSS >10 GALLONS | FUELLOSS | 10 | john@gmail.com | -REDACTED- | | 1234 |
| FUEL LOSS ALL TRUCKS | LOSS >10 GALLONS | FUELLOSS | 10 | mary@gmail.com | -REDACTED- | | 190, 195, 192, 241, 243, 244, 246, 247, 370, 999 |
| TEMP ALERTS | TEMP <32 | FUELTEMPERATURE | 32 | tom@gmail.com | -REDACTED- | | 190, 192, 195, 241, 243, 244, 246, 247, 370, 999 |
| TEST FL | ANOTHER TEST | FUELLOSS | 100 | bruce@gmail.com | -REDACTED- | | |
| TEST ALERT | TEMPERATURE <20 DEG | FUELTEMPERATURE | 20 | bill@gmail.com | -REDACTED- | 1 | 244, 247, 1234 |

MANAGE ALERTS
SELECT AN ALERT TO MANAGE ITS PROPERTIES, OR CONFIGURE A NEW ALERT.

SELECT AN ALERT:　ALERT 4 ▼

ALERT TYPE:　FUEL LOSS ▼

ALERT NAME
ALERT 4

ALERT DESCRIPTION
LOSS >10 GALLONS

FIG. 18B 258

TRIGGER THRESHOLD, GALLONS, TEMPERATURE, ETC.
10
EMAIL LIST. SEPARATE MULTIPLE EMAIL ADDRESS WITH COMMAS.
john@gmail.com PRODUCT FILTER
CHECK PRODUCTS TO APPLY THIS ALERT TO:
☑ -REDACTED-
☑ -REDACTED-
☑ -REDACTED-

SAVE  MODIFY  DELETE

EXPORT AND SHARE
SELECT A REPORT TYPE BELOW TO DOWNLOAD AND SAVE THE REPORT
OR ENTER AN EMAIL ADDRESS BELOW TO SEND AND SHARE.

○ ⬛

SAVE  PRINT

OTHER OPTIONS
OPTIONALLY LIMIT TO A SINGLE GROUP:
GROUP: [ALL] ⬥
OPTIONALLY LIMIT TO SPECIFIC UNIT NUMBERS.
SEPARATE MULTIPLE NUMBERS WITH COMMAS.
UNITS
1234

EMAIL ADDRESS
SEND TO MULTIPLE ADDRESSES BY SEPARATING
THEM WITH COMMAS.

EMAIL

FIG. 19 260

PRODUCT CONFIGURATION
MANAGE PRODUCT TYPES.

PRODUCT CODE | DESCRIPTION
-REDACTED- | -REDACTED-
-REDACTED- | LAB TEST UNIT
-REDACTED- | VERSION 1 PROTOTYPE

MANAGE PRODUCTS
SELECT A PRODUCT TO MANAGE ITS PROPERTIES, OR ADD A NEW PRODUCT.
SELECT A PRODUCT: ACUTRAC1

PRODUCT CODE
-REDACTED-

DESCRIPTION OF PRODUCT
-REDACTED-

SAVE  MODIFY  DELETE

EXPORT AND SHARE
SELECT A REPORT TYPE BELOW TO DOWNLOAD AND SAVE THE REPORT OR ENTER AN
EMAIL ADDRESS BELOW TO SEND AND SHARE.

SAVE  PRINT

EMAIL ADDRESS
SEND TO MULTIPLE ADDRESSES BY
SEPARATING THEM WITH COMMAS.

EMAIL

FIG. 20 262

FIRMWARE UPDATES
MANAGE FIRMWARE AND TANK TABLE UPDATES.

UPDATE PRODUCTS
☑ -REDACTED-
☑ -REDACTED-
☑ -REDACTED-

SELECT FIRMWARE AND OPTIONS

OPTIONALLY LIMIT TO A SINGLE GROUP:
GROUP: [ALL] ▼

OPTIONALLY LIMIT TO SPECIFIC UNIT NUMBERS.
SEPARATE MULTIPLE NUMBERS WITH COMMAS.
UNITS

SELECT FIRMWARE TO BE APPLIED.
SELECT FIRMWARE: -REDACTED- ▼
UPDATE FIRMWARE

SELECT NEW TANK TABLE.
TANK TABLE: -REDACTED- ▼
UPDATE TANK 1 | UPDATE TANK 2 | UPDATE TANK 3

EMAIL ADDRESS
SEND TO MULTIPLE ADDRESSES BY
SEPARATING THEM WITH COMMAS.
EMAIL

EXPORT AND SHARE
SELECT A REPORT TYPE BELOW TO DOWNLOAD AND SAVE THE REPORT
ENTER AN EMAIL ADDRESS BELOW TO SEND AND SHARE.
SAVE | PRINT

REPT ▼ | LOGS ▼ | CONFIG ▼ | HELP ▼
DASHBD | LOG OUT | READER

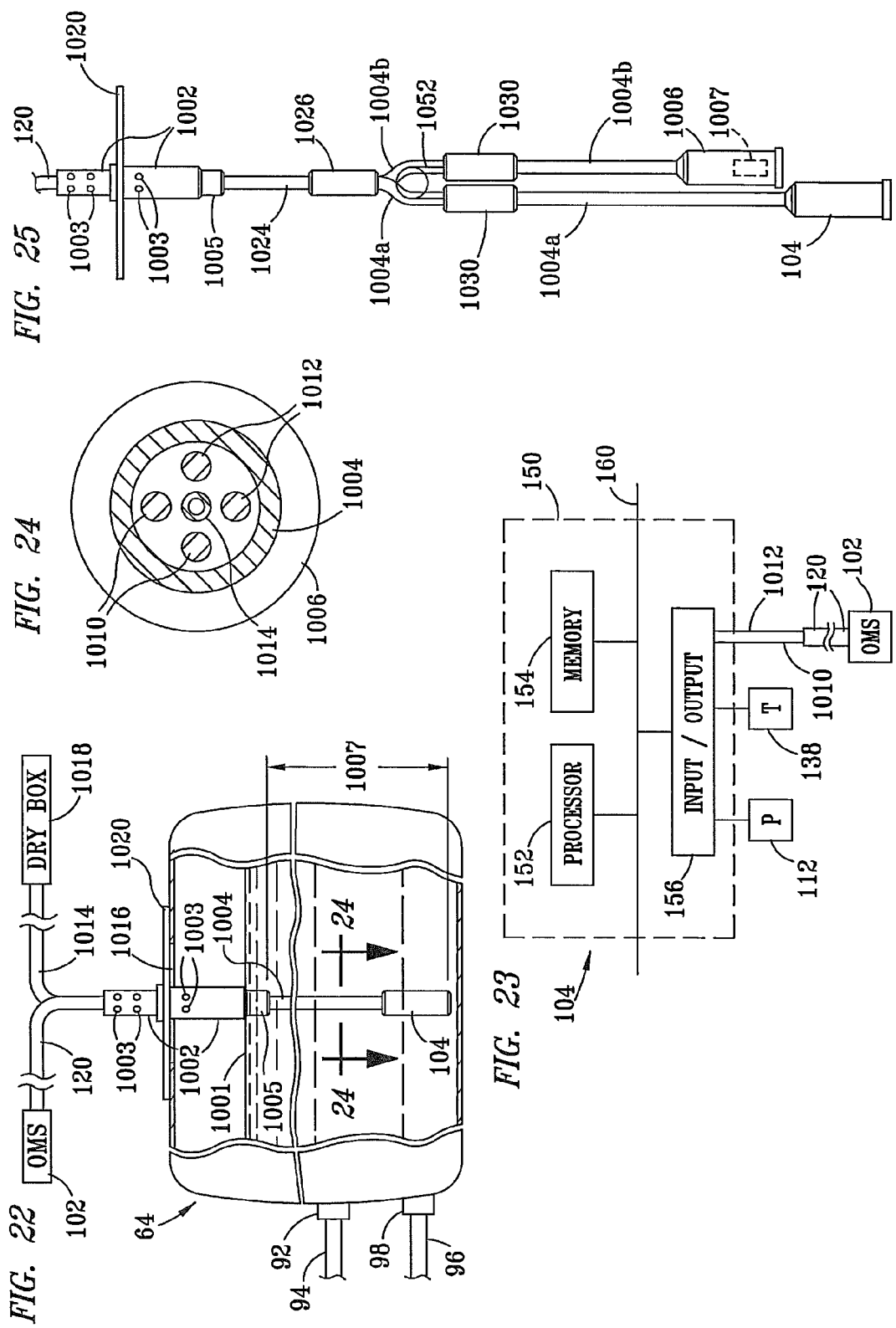

SYSTEM AND METHOD FOR DETERMINING VOLUME OF FLUID IN A TANK

CROSS-REFERENCE TO RELATED APPLICATIONS

This application claims the benefit of U.S. Provisional Application No. 61/897,426, filed Oct. 30, 2013, which application is hereby incorporated herein by reference, in its entirety.

TECHNICAL FIELD OF THE INVENTION

This invention relates, in general, to determining the volume of fluid in a tank and, more particularly, to systems and methods for determining the volume of a consumable, such as gasoline or diesel fuel, used, for example, in a commercial transportation vehicle fleet.

BACKGROUND OF THE INVENTION

It is not uncommon for commercial vehicle operators to use company charge cards for purchasing fuel in large quantities. Unscrupulous vehicle operators have been known to make fuel charges for fuel which was not added to the fuel tank of the approved vehicle, but instead added to the fuel tank of an accomplice vehicle operator's vehicle for which the accomplice may give the unscrupulous vehicle owner a monetary kickback. Other schemes derived by unscrupulous vehicle operators include collusion with service station operators to overcharge company charge cards in exchange for a monetary kickback and siphoning fuel from the fuel tank.

In light of the foregoing, an ongoing need exists for systems and methods which ensure that consumables, such as fuel, purchased on company charge cards is appropriately used for approved commercial vehicles. It would also be desirable that such systems and methods would mitigate or eliminate unscrupulous vehicle operators from stealing fuel or overcharging company charge cards. Still further, it would be desirable that such systems and methods would optimize the fuel consumption cycle, including purchase, verification, and performance, for not only a single vehicle, but for a fleet of commercial vehicles.

SUMMARY OF THE INVENTION

The present invention accordingly provides a system and method for determining volume of a fluid in a tank by first measuring the pressure of fluid proximate to the bottom of the tank. The depth of the fluid is then determined from the pressure and density of the fluid. Fluid volume is then determined mathematically or from charts given the depth as well as the size and shape of a tank. Multiple pressure readings may be taken along the bottom of a tank, and an average pressure determined that may be used to calculate volume. Pressure readings may be taken at different heights to determine fluid density used to calculate volume. Pressure readings may be adjusted for atmospheric pressure. Volume increases or decreases exceeding a predetermined threshold may be flagged and alerts generated. Volume calculations may be recorded for comparing against a volume of fluid recorded as being purchased.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 8 is a screenshot diagram exemplifying details of an event depicted in the screenshot of FIG. 7;

FIG. 9 is a screenshot exemplifying details of a User Access Configuration form depicted in FIG. 6;

FIG. 10 is a screenshot exemplifying details of a Fuel Purchase Reconciliation Report depicted in FIG. 6;

FIG. 11 is a screenshot exemplifying details of a Real Time Fuel Inventory report depicted in FIG. 6;

FIG. 12 is a screenshot exemplifying details of a Fuel Loss Events report depicted in FIG. 6;

FIG. 13 is a screenshot exemplifying details of a Daily Fuel Logs report depicted in FIG. 6;

FIG. 14 is a screenshot exemplifying details of a Fuel Purchase Logs report depicted in FIG. 6;

FIGS. 15A and 15B is a screenshot exemplifying details of a Fuel Probe Configuration form depicted in FIG. 6;

FIGS. 16A and 16B is a screenshot exemplifying details of a Fuel Purchase Report Configuration form depicted in FIG. 6;

FIGS. 17A and 17B is a screenshot exemplifying details of a Report Configuration form depicted in FIG. 6;

FIGS. 18A and 18B is a screenshot exemplifying details of an Alerts Configuration form depicted in FIG. 6;

FIG. 19 is a screenshot exemplifying details of a product configuration form depicted in FIG. 6;

FIG. 20 is a screenshot exemplifying details of a Firmware Updates form depicted in FIG. 6;

FIG. 22 exemplifies a single fuel volume sensor configured for insertion into a fuel tank of the tractor of FIG. 3;

FIG. 23 is a schematic block diagram of the fuel volume sensor of FIG. 22;

FIG. 24 is a cross-section of a tube taken along line 24-24 of FIG. 22;

FIG. 25 exemplifies a dual fuel volume sensor configured for insertion into a fuel tank of the tractor of FIG. 3;

DETAILED DESCRIPTION OF THE INVENTION

Figure 1:
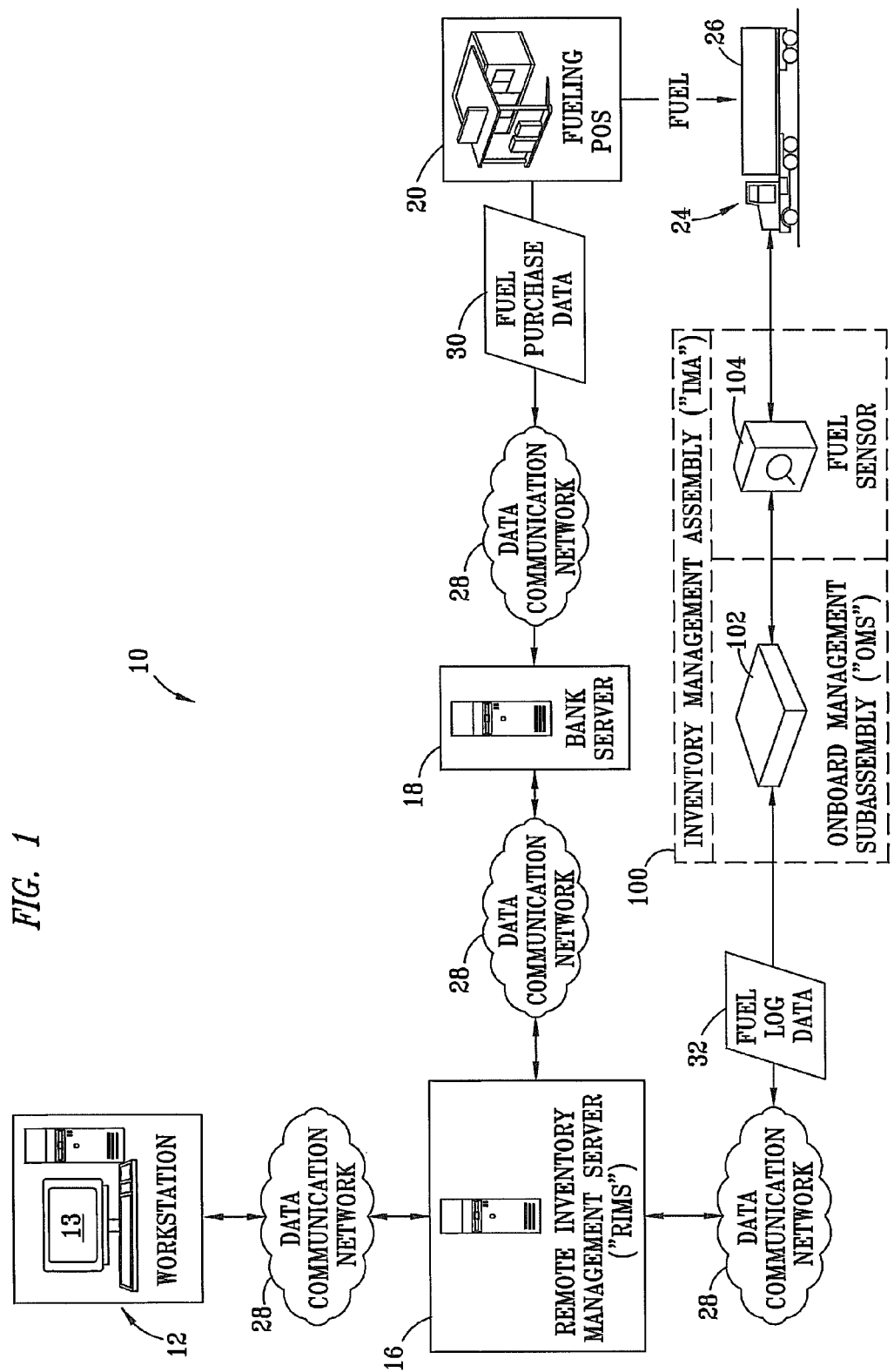
FIG. 1 is a schematic block diagram exemplifying one embodiment of a system for managing inventory of a consumable in a commercial vehicle fleet, according to the teachings presented herein.

Refer now to the drawings wherein depicted elements are, for the sake of clarity, not necessarily shown to scale and wherein like or similar elements are designated by the same reference numeral through the several views. In the interest of conciseness, well-known elements may be illustrated in schematic or block diagram form in order not to obscure the present invention in unnecessary detail, and details concerning various other components known to the art, such as computers, workstations, data processors, databases, pressure and temperature sensors, data communication networks, radio communications, and the like necessary for the operation of many electrical devices and systems, have not been shown or discussed in detail inasmuch as such details are not considered necessary to obtain a complete understanding of the present invention, and are considered to be within the skills of persons of ordinary skill in the relevant art. Additionally, as used herein, the term "substantially" is to be construed as a term of approximation.

It is noted that, unless indicated otherwise, computational and communication functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 2:
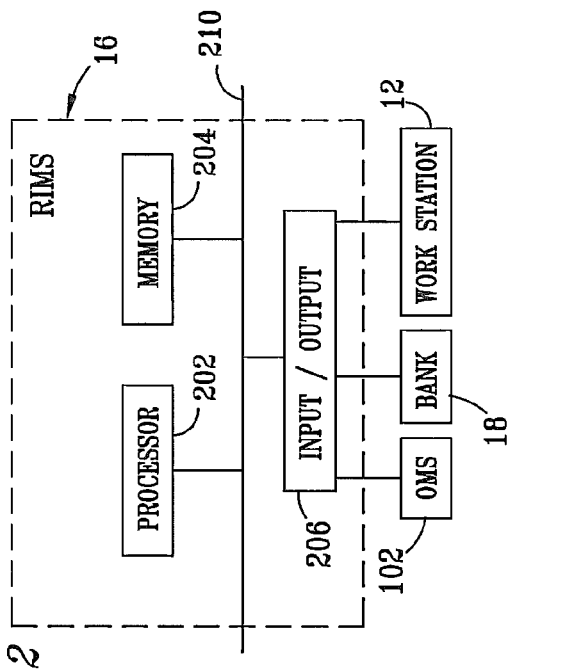
FIG. 2 is a schematic block diagram exemplifying a remote inventory management server depicted in FIG. 1.

Referring to FIG. 1, there is depicted a system for managing inventory of a consumable, which is schematically illustrated and designated by the reference numeral 10. The system 10 includes a remote inventory management server ("RIMS") 16. As shown in FIG. 2, RIMS 16 includes a processor 202 and memory 204 interconnected via a bus 210. Memory 204 is effective for storing a database and computer program code executable by processor 202 for performing functions in accordance with principles of the invention, preferably as a web application, discussed in further detail below. RIMS 16 further includes capacity for a number of inputs and outputs ("I/O") 206, also discussed below.

Returning to FIG. 1, the system 10 further includes at least one fueling station point of sale ("POS") 20. POS 20 is configured for supplying a consumable, referred to herein as "fuel", to at least one vehicle, such as a tractor 24 pulling a trailer 26, or any of a number of other types of vehicles, such as trucks (e.g., large-transport-on-highway vehicles), automobiles, trains, boats, ships, airplanes, railroad locomotives, electric transport vehicles, construction vehicles, municipality fleets, vehicle-independent applications (e.g., oil & gas drilling rigs), and the like, referred to collectively herein as a "tractor". By way of example, but not limitation, fuel includes gasoline, diesel, electrical energy, oil, urea, or other fuel or fluid, and the like. POS 20 is further adapted for receiving payment of fuel by way of a charge card, such as fuel cards, credit cards, and debit cards, in exchange for providing fuel, and for generating from such sale, fuel purchase data 30. Fuel purchase data 30 preferably includes an invoice number, an identification of who and/or for which vehicle fuel was purchased, a location, date, and time of a purchase, a quantity (e.g., number of gallons) and cost of fuel purchased, the cost including total cost as well as price per unit (e.g., gallon) of fuel purchased. Mileage of tractor 24 is optionally provided as well with the fuel purchase data. Fuel purchase data 30 preferably excludes any proprietary information, such as the number of a charge card that could be used to commit fraud against the legitimate holder of the card. POS 20 is coupled via the network 28 for transmitting fuel purchase data 30 to at least one electronic bank server 18 adapted for handling charge cards. Bank server 18 is coupled via network 28 for forwarding fuel purchase data 30 to RIMS 16 via I/O 206.

As discussed in further detail below with respect to FIG. 3, tractor 24 preferably includes a fuel sensor 104 positioned in each of at least one fuel tank, and is effective for measuring characteristics of fuel, referred to herein as fuel log data 32, discussed in further detail below with respect to FIG. 4, and for transmitting that fuel log data to an onboard management system ("OMS") 102, mounted on the tractor. OMS 102 is coupled via network 28 for transmitting fuel log data 32 to RIMS 16 via I/O 206.

At least one work station 12 is also coupled to RIMS 16 via network 28. Work station 12 preferably includes a processor and memory (not shown) configured for storing computer program code executable by the processor for providing an interface between RIMS 16 and a user. While not shown, a "user", as the term is used herein, includes, by way of example but not limitation, a transportation fleet administrator or manager, or a transportation carrier or logistics provider responsible for managing a fleet of tractors, such as tractor 24, to haul various goods on trailers. Work station 12 preferably also includes conventional computer input devices, such as a keyboard and mouse, and output devices, such as a display monitor 13.

Figure 3:
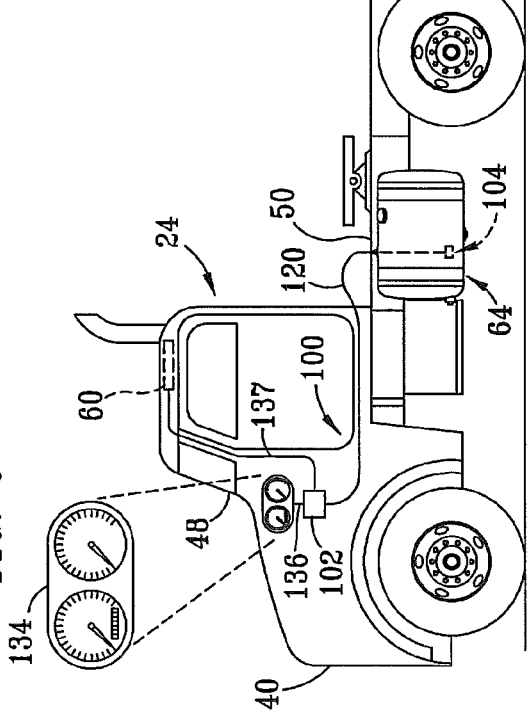
FIG. 3 exemplifies a tractor depicted in FIG. 1.

FIG. 3 depicts in greater detail a tractor 24 equipped for functioning in accordance with principles of the invention. The tractor 24 includes an engine compartment 40 housing an engine and other components, as well as a cabin 48 positioned behind engine compartment 40 and above a vehicle chassis 50. Two storage tanks, referred to herein as fuel tanks, 64 (only one of which is shown) are typically mounted to the vehicle chassis 50 anterior to cabin 48.

In one embodiment, the system 10 components associated with tractor 24 include, but are not limited to, an inventory management assembly ("IMA") 100 having an onboard management subassembly ("OMS") 102 coupled via a data communication link 120 to at least one sensor 104 positioned within each of at least one respective fuel tank 64 for detecting fuel volume, as discussed in further detail below with respect to FIGS. 21-28. In one implementation, the OMS 102 may be partially or totally integrated with an onboard diagnostic recorder (not shown) of tractor 24.

Figure 4:
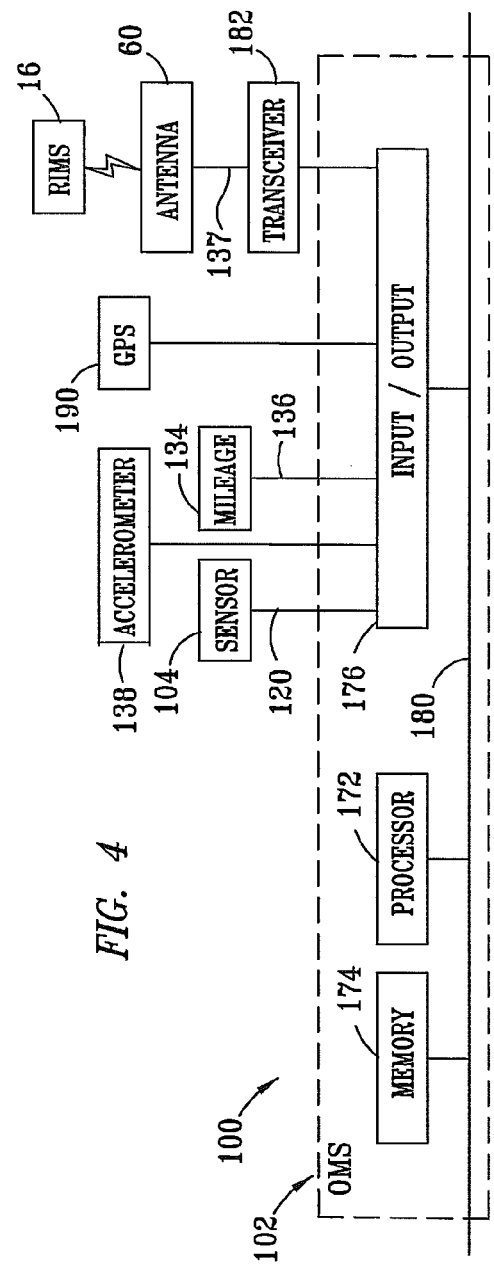
FIG. 4 is a schematic block diagram exemplifying an onboard management subassembly utilized on the tractor of FIG. 3.
Figure 15B:
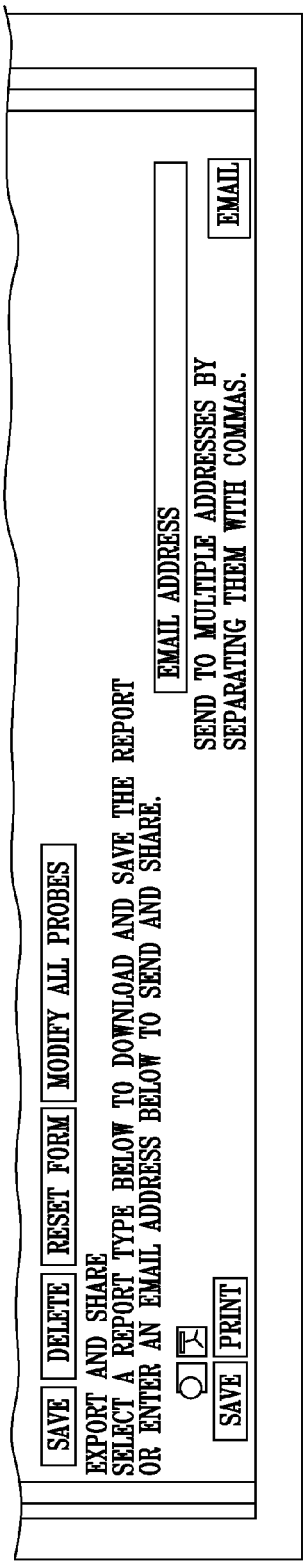

As shown most clearly in FIG. 4, the IMA 100 and, in particular, the OMS 102, includes a processor 172, a memory 174, and various inputs and outputs ("I/O") 176 interconnected via a bus 180. Memory 174 is preferably flash memory, effective for storing computer program code executable by processor 172. At least one sensor 104 is preferably coupled via link 120 to I/O 176 for providing to OMS 102 data signals indicative of fuel volume, such as pressure and temperature. Further inputs to OMS 102 include data indicative of mileage of the tractor 24 received via line 136 from an odometer 134 located within the cabin 48 or equivalent component on tractor 24. In one implementation, OMS 102 I/O 176 optionally includes an accelerometer 138, such as a three-axis self-orientating accelerometer, which may provide data such as the motion, degree of incline, and event-related activity of tractor 24. Various compensational adjustments may be made to the data based on the accelerometer readings, discussed further below with respect to FIGS. 15A and 15B. In the illustrated implementation, the IMA 100 preferably also includes a Global Positioning System ("GPS") 190 coupled to the OMS 102 through I/O 176 for facilitating the generation of data relative to the vehicle location and date/time. Data generated by OMS 102 may also include access to a controller area network ("CAN"), a vehicle bus standard designed to allow microcontrollers and devices to communicate with each other within a vehicle without a host computer. In another embodiment, a sensor may optionally be provided to measure fuel quality, such as BTU-values or other quality characteristics that would assist in determining the quality of the consumable. Data input, such as fuel volume, fuel temperature, fuel quality, mileage, accelerometer data, location, tractor identification, date and time, are referred to collectively herein as "fuel log data". OMS 102 I/O 176 includes a transceiver 182 coupled via a line 137 to an antenna 60 (FIG. 3) mounted in the cabin 48 for transmitting fuel log data wirelessly via network 28 to RIMS 16.

Figure 5:
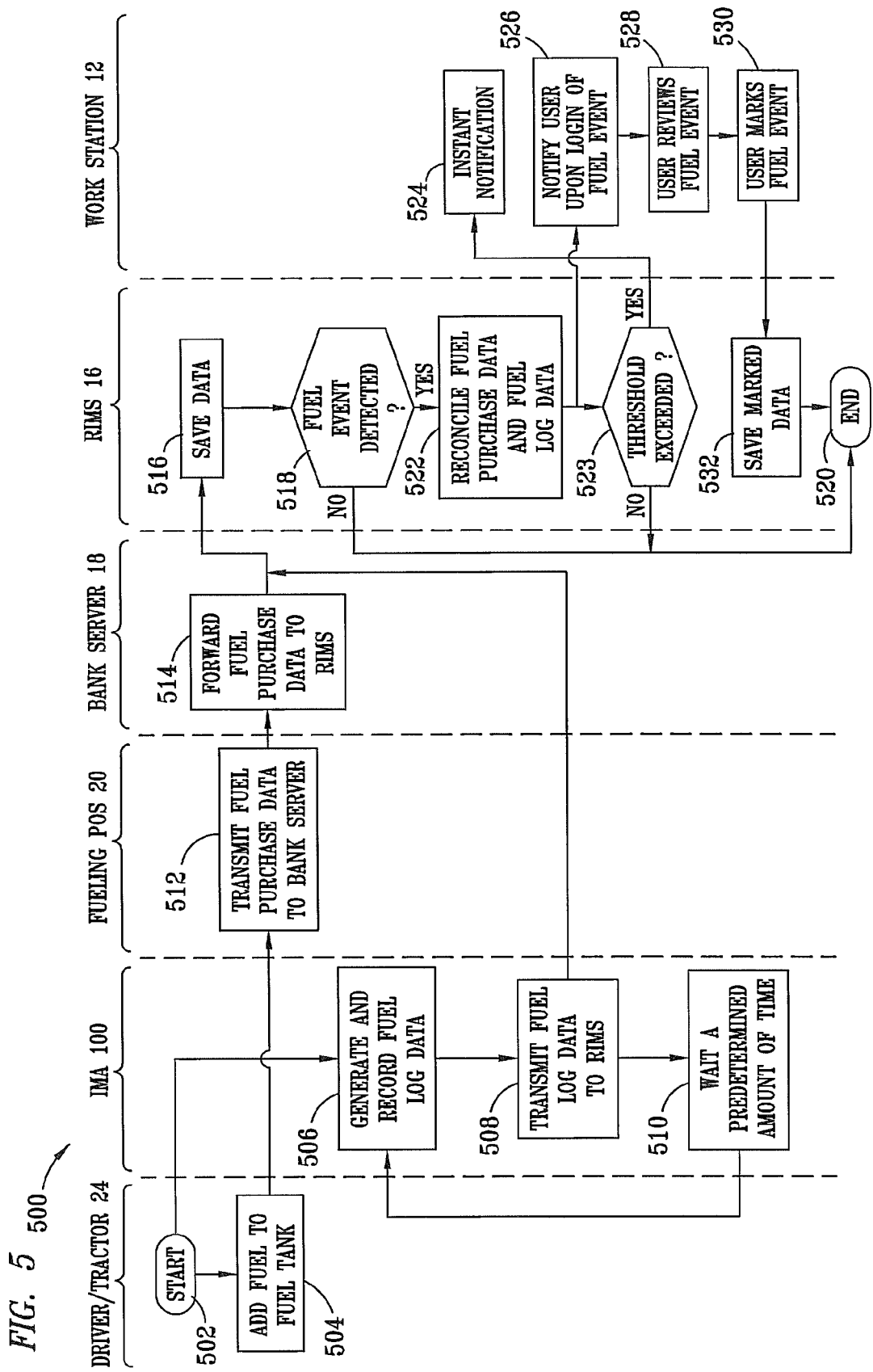
FIG. 5 is a flow chart exemplifying steps in a process for managing inventory of a consumable, according to the teachings presented herein.

FIG. 5 is a flow chart of preferred steps performed by system 10 for managing the inventory of a consumable, such as gasoline or diesel fuel, used, for example, in a commercial transportation vehicle fleet. Beginning at step 502, execution proceeds to steps 504 and 506. At step 504, a driver of tractor 24 adds fuel purchased from a fueling POS 20 to at least one tank 64 of his/her tractor. At step 512, the fueling POS 20 generates and transmits fuel purchase data 30 (e.g., invoice number, vendor, date and time, location, vehicle or driver identification, quantity of fuel purchased, and total and per unit cost of the fuel) to bank server 18 which, in step 514, forwards the data to RIMS 16 which, in step 516, saves the data to memory 204. Returning to step 506, the at least one fuel sensor 104 of IMA 100 generates a data signal indicative of the fuel pressure, density, and/or volume and optionally, of fuel temperature also, and transmits same to OMS 102. OMS 102 then generates fuel log data, including fuel pressure, density, and/or volume (and optionally temperature), vehicle and/or driver identification, date/time, and location. In step 508, OMS 102 transmits the fuel log data to RIMS 16. At step 516, the fuel log data 32 is saved to memory 204 of RIMS 16. In step 510, OMS 102 waits a predetermined length of time, such as thirty seconds, and execution returns to step 506.

It may be appreciated that there may be hundreds of transmissions of fuel log data 32 from IMA 100 for each transmission of fuel purchase data from fueling POS 20. Furthermore, in an alternative embodiment of the invention, fuel log data 32 may be accumulated in OMS 102 and not transmitted to RIMS 16 until a predetermined quantity of data is accumulated, until there is an increase in fuel volume (e.g., a fill-up), or until the accelerometer 138 (or alternatively, the GPS 190 or speedometer 134) indicates that the tractor has stopped long enough (e.g., 30 seconds, preferably a configurable time) to add fuel to its at least one fuel tank. Because fuel levels may vary due to motion, vibrations, sloshing in the tank, and the like, it is preferable to use rolling averages of fuel volume calculated from averaging a predetermined number of the most recent volume calculations each time a new measurement is taken. It may be preferable in many instances to reduce the increment of time between measurements (e.g., from 30 seconds to 1 second) when fuel is being added to a tank (as may be determined as described above using an accelerometer, GPS, or speedometer) so that more accurate measurements may be made during fill-ups.

Subsequent to saving fuel purchase data 30 and fuel log data 32 at step 516, execution proceeds to step 518 wherein a determination is made whether there is an auditable fuel event. An auditable fuel event occurs when there is a non-trivial increase or decrease in fuel volume, that is, an increase or decrease in fuel volume which exceeds a predetermined threshold. This can happen in at least the following three scenarios:

1. A decrease in volume reported by fuel log data 32, which decrease exceeds by at least a predetermined threshold amount a decrease that would be expected from the consumption of fuel by an engine, that is, that would be attributable to mileage or miles per gallon ("MPG"); this would indicate a fuel loss typically resulting from fuel theft (e.g., siphoning of fuel) (wherein execution would proceed to steps 524 and 526, discussed below) or potential leakage from the fuel tank and/or fuel system which could result in economical and environmental impacts (wherein execution would proceed to step 526, discussed below).

2. An increase in volume reported similarly by both fuel purchase data 30 and fuel log data 32, i.e., a normal fill-up (wherein execution would proceed to step 526, discussed below).

3. An increase in volume wherein the volume reported by fuel purchase data 30 exceeds a volume reported by fuel log data 32 by a predetermined threshold, in which case an alert is generated. This alert would typically indicate that a fueling station 20 ran up the number of gallons on the transaction and gave a driver a monetary kickback. This could also occur when a fueling station 20 up-charged a customer on a per/gallon basis (wherein execution would proceed to steps 524 and 526, discussed below).

Accordingly, a non-trivial fuel volume increase may occur when there is a fill-up, rather than motion, vibration, and/or sloshing of fuel in a tank. A non-trivial fuel volume decrease may occur when there is a theft by the siphoning of fuel from a tank, rather than for reasons attributable to miles per gallon ("MPG") of fuel. If, at step 518, a transmission of fuel log data is received that does not indicate a non-trivial increase or decrease in fuel volume, then no fuel event is deemed to have occurred, and execution proceeds to, and terminates at, step 520. If, at step 518, a non-trivial increase or decrease in fuel volume is detected, then an auditable fuel event is deemed to have occurred, and execution proceeds to step 522.

At step 522, if a non-trivial increase in fuel volume has been detected, then there should also be corresponding fuel purchase data having substantially similar date and time stamps for a respective tractor 24. RIMS 16 attempts to identify such fuel purchase data. If such fuel purchase data cannot be located, a report of same is generated. If such fuel purchase data is identified, then the volume of fuel purchased is compared with the volume of fuel logged and a difference is determined; execution then proceeds to steps 523 and 526. In step 523, a determination is made whether the difference determined in step 522 exceeds a predetermined threshold, such as a fuel loss greater than ten gallons, or a fuel temperature that drops below 32° F. If it is determined that such threshold has been exceeded, then execution proceeds to step 524; otherwise, execution from step 523 terminates at step 520. In step 524, the fuel purchase data, fuel log data, and difference is preferably transmitted via email to the workstation 12 display 13 and/or via text (e.g., Short Message Service ("SMS")) to a user for instant notification.

In step 526, upon login to workstation 12, a user is notified of the fuel event, preferably by a report on display 13 (discussed in greater detail below with respect to FIG. 7), or alternatively by a hard copy printout. In step 528, the user preferably reviews the report and determines whether any action is necessitated, marking the report accordingly in step 530, the marking preferably including the date and time of review, as well as the identification of reviewer. By way of example, if the difference between the volume of fuel purchased (per fuel purchase data 30) and the volume of fuel logged (per fuel log data 32) indicates that the quantity of fuel purchased was greater than the quantity of fuel logged in the at least one tank 64, then fraud is suggested, and appropriate action may be taken against the driver to resolve the situation. Similarly, if a non-trivial decrease in fuel occurs, suggesting that fuel has been siphoned off by way of theft, then appropriate action may be taken against the driver to resolve the situation. In step 532, the report, including any mark-ups, is saved in memory 204 of RIMS 16. Execution is then terminated at step 520.

Figure 6:
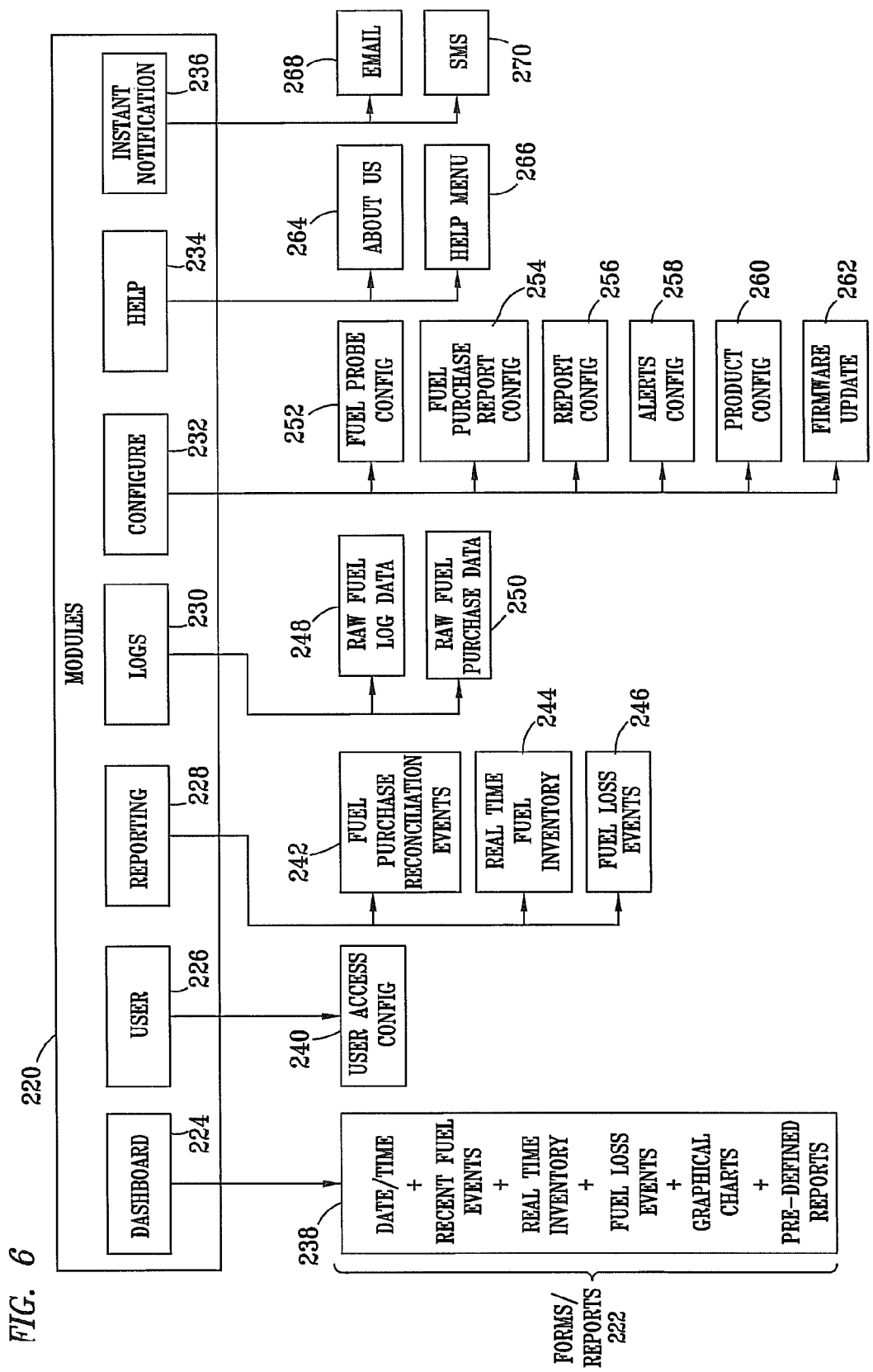
FIG. 6 is a graphical block diagram depicting one embodiment of operational modules, which form a portion of the system for managing inventory of a consumable exemplified in FIG. 1.

FIG. 6 illustrates seven categories or modules 220 of forms, reports, and functions 222 available from RIMS 16 upon execution by processor 202 of computer program code stored in memory 204 for managing inventory of a consumable, such as fuel. The modules 220 are preferably accessible via menu buttons such as exemplified proximate to the upper right portion of the forms and reports described here. As discussed in further detail below, the modules 220 include a dashboard module 224, a user module 226, a reporting module 228, a logs module 230, a configure module 232, a help module 234, and an instant notification module 236. These menu items are preferably accessible via software "buttons" provided on the forms and reports described herein, and exemplified proximate to the upper portion of each form and report described herein.

Figure 7:
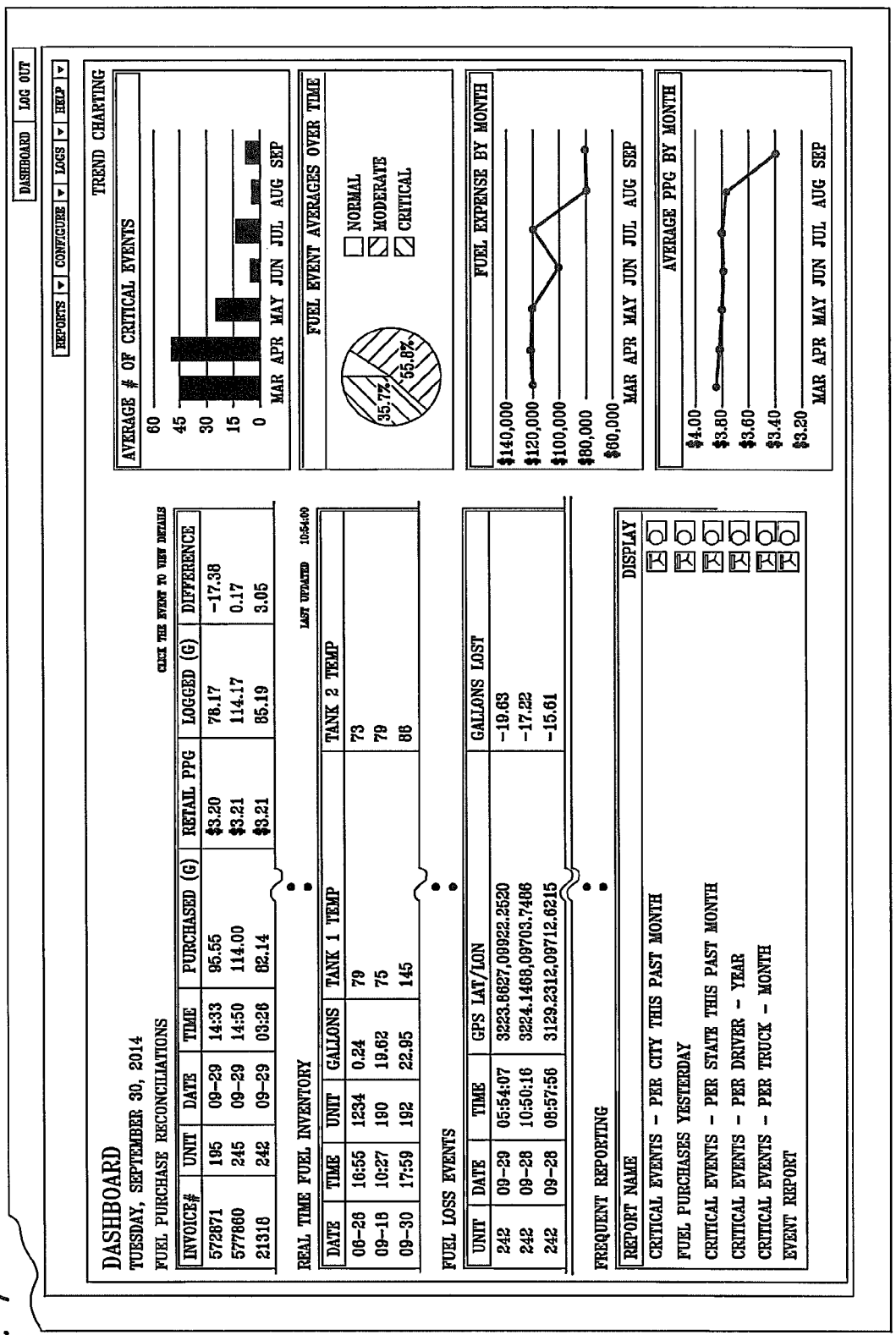
FIG. 7 is a screenshot exemplifying details of a Dashboard report depicted by FIG. 6.

More specifically, and with reference to FIG. 7, the dashboard report 238 is preferably the first screen a user sees when he or she logs onto RIMS 16, and preferably provides up-to-date, real-time information about the system 10. By way of example and not limitation, the dashboard module 224 preferably supports the generation and presentation of a dashboard report 238 that includes date/time, recent fuel events (e.g., fuel tank fill-ups), real time inventory, fuel loss events, graphical trend charts, and a number of frequently used, pre-defined reports, as discussed in further detail below.

Recent fuel events, also referred to as fuel purchase reconciliations and discussed above with respect to steps 518 and 522 of FIG. 5, present both fuel purchase data 30 with fuel log data 32, related by common data including date, time, and preferably unit, or tractor, ID. Fuel purchase data 30 preferably also includes invoice number, the number of gallons purchased, and the retail price per gallon ("PPG").

Fuel log data 32 preferably further provides gallons received. Then, as also depicted by step 522 of FIG. 5, discussed above, gallons purchased is compared with gallons received, and the difference, also referred to as a reconciliation, is presented. If a user clicks on a row, or record, of the fuel purchase reconciliations, an event details report 239 pops up, as exemplified in FIG. 8. It is considered that the information depicted in FIG. 8 is self-explanatory and, therefore, does not warrants detailed discussion. While the dashboard report 238 as exemplified only displays recent fuel events, fuel event data for any date range is available from the Fuel Purchase Reconciliations Report 242, available under the reporting module 228 and exemplified by FIG. 10.

The dashboard report 238 further preferably includes recent Real Time Fuel Inventory data, which provides current information about the status of fuel in fuel tanks 64. Such information preferably includes not only current gallons of fuel available for each tractor 24, but also the temperature of the fuel in each tank 64 of tractor 24. Fuel temperature is important to monitor because, as fuel gets cool under cold-weather conditions, it may begin to approach a gel state, wherein the viscosity of the fuel begins to change which can have a significant detrimental impact on the performance of an engine. As such, RIMS 16 notifies a user when the temperature of the fuel is approaching a gel-like state so that the driver can take proactive steps (e.g., add an additive to the fuel or switch to a different fuel) to prevent or prepare for such a situation. While the dashboard report 238 as exemplified only displays recent fuel inventory data, fuel inventory data for any date range is available from the Real Time Fuel Inventory Report 244, available under reporting module 228 and exemplified by FIG. 11.

Still further, dashboard report 238 preferably also reports recent fuel loss events, that is, a non-trivial decrease in fuel that is not accountable by use of fuel by the tractor 24, but is possibly due to fuel theft, such as siphoning of fuel from a fuel tank. If there is such a fuel theft event, then the user will be notified by the dashboard report. As discussed above with respect to step 524 of flow chart 500 (FIG. 5), a user and respective driver are notified immediately of such theft via email and/or SMS text messaging. While the dashboard report 238 as exemplified only displays recent fuel loss events, fuel loss data for any date range is available from the Fuel Loss Events report 246, available under reporting module 228 and exemplified by FIG. 12.

The dashboard report 238 preferably also includes graphical trend charts, including charts showing the average number of fuel events in recent months, what proportion of fuel events are considered normal, of moderate concern, and of critical concern. Charts are preferably also provided showing fuel expenses for recent months, as well as average price per gallon of fuel for recent months.

Access to other pre-defined reports that are frequently used are also provided. By way of example, pre-defined reports may include reports of critical, or auditable, events by city, state, driver, and/or truck for the past month, year, or other selected time period. Pre-defined reports may further include reports of the percentage of fuel purchases (by vehicle) resulting in a critical (i.e., auditable) event, or of fuel purchases made the previous day, for example. An event report may be generated to show fuel purchase reconciliations for a pre-determined time period, such as year-to-date, or a rolling previous period, such as the previous six or twelve months. This would allow a user to easily access all such transactions rather than having to wade through the reporting menu and search for them.

Under user module 226, a user, preferably limited to an administrative user, may access a User Access Configuration report 240. As shown most clearly by FIG. 9, the user access configuration report identifies all users who have access to RIMS 16, preferably including their respective user name, email address, access group or privilege, and the last time they logged onto RIMS. Through the User Access Configuration report, a user with administrative rights may control who has access to RIMS 16 by adding users, removing users, and establishing and modifying user profiles, including their security rights, also referred to as privileges. By way of example, two security profiles are depicted in FIG. 9, a "system administrative" profile, which has no restrictions, and a "viewer" profile, which is limited to viewing forms and reports, but not entering or editing any data on them.

Under the reporting module 228, three reports 242, 244, and 246 (FIGS. 10-12) are available, which report similar data as discussed above with respect to dashboard 238, but which cover any date range selectable by a user. The substance of these reports has been discussed above, and therefore will not be discussed in further detail herein.

Under the logs module 230, two reports are available, a raw fuel log data report (entitled "Daily Fuel Logs") 248 and a raw fuel purchase data report (entitled "Fuel Purchase Logs") 250, exemplified by FIGS. 13 and 14, respectively. The raw fuel log data report 248 reports fuel log data 32 that is received from the OMS 102, and the raw fuel purchase data report 250 reports fuel purchase data 30 that is received from the bank server 18. Data in reports 248 and 250 is used in other reports, such as the dashboard report 238, the three reports 242, 244, and 246, as well as the process depicted in flow chart 500 discussed above with respect to FIG. 5.

Configure module 232 preferably includes at least six forms 252-262 that enable users to configure various aspects of RIMS 16. A Fuel Probe Configuration form 252, exemplified by FIGS. 15A and 15B, enables a user to configure and customize the settings of individual fuel probes, or groups of probes, also referred to herein as fuel sensors, 104. These configurations are then sent to the unit (e.g., tractor 24) wirelessly (i.e., over-the-air), allowing for real-time updates to be made to sensors 104. As shown on FIGS. 15A and 15B, some of the settings constituting the configurations include the following:

IP Address: for the tractor 24

Status Update Time: how often (preferably in hours) a tractor 24 transmits a report to RIMS 16, the report including fuel log data accumulated subsequent to a last transmission, fuel log data preferably including pressure and temperature readings, GPS data, accelerometer data, and date/time stamps Pressure steady count: number of counts (i.e., units of measurement arbitrarily chosen for convenience in using the invention) in pressure that are considered to be slight variations that are not taken into account when assessing whether or not there has been a fuel event (e.g., a fill-up or fuel loss)

Log time interval: how often (preferably in seconds) fuel log data 32 is written to memory 174 of the OMS 102 (i.e., sample rate)

X, Y, Z change: the threshold amount of change allowed in the X, Y, or Z directions of the accelerometer 138 before it is considered to indicate movement of the tractor 24 estartrig: the threshold for number of increase or decrease counts that will trigger the start of a fuel add or loss event, respectively estoptrig: the threshold for number of increase, decrease or steady counts that will trigger the end of a fuel add or loss event esamples: the number of pressure samples in the event averaging buffer echangetrig: the pressure change threshold that is considered to result from a "change in pressure" rather than random movement of fuel, such as sloshing esteadyclear: the number of times a pressure change less than "echangetrig" that will clear the up/down change counters esloshcount: the number of seconds to wait after movement of the tractor 24 has been detected before starting all event counters, that is, configuration variables that have to do with how the fuel events (e.g., fill-ups or fuel losses) are detected and processed geltemp: the temperature at which fuel begins to gel Tank Size: size of the tank (e.g., in gallons)

Pressure when full: total pressure reading when tank 64 is full

Pressure per inch: reading from the sensor 104 that will be considered an inch of fuel Pressure adjust: a value always added to pressure readings from the sensor 104 to account for pressure sensors being slightly off the bottom of a tank 64

It is considered that the use of the above-identified variables and settings in the system 10 of the invention would be apparent to a person having ordinary skill in the art upon a reading of the description of the invention herein, and therefore will not be described in further detail herein.

A Fuel Purchase Report Configuration form 254, exemplified by FIGS. 16A and 16B, enables a user to configure the fuel purchase reports, which are used for fuel event reconciliations against raw fuel log data. The user may manage how fuel purchase data 30 is imported from bank server 18 to RIMS 16 by configuring automated data downloads from bank server 18, either in real time or periodically (e.g., nightly), or by manually downloading charge card data in spreadsheet format from bank server 18 to workstation 12 followed by upload (via form 254) of spreadsheet from workstation 12 to RIMS 16.

A Report Configuration form 256, exemplified by FIGS. 17A and 17B, enables a user to configure customized reports, including the content thereof, using data collected and stored by the system 10. Such reports may preferably be generated on an ad hoc basis or may be scheduled to be generated on a recurring basis.

An Alerts Configuration form 258, exemplified by FIGS. 18A and 18B, enables a user to configure instant notifications, or alerts. A user preferably has the option to configure at least fuel loss and/or temperature alerts which can be sent to the user, such as by way of email or SMS (e.g., text) message. Alerts may be grouped by units (e.g., tractors 24) and sent to one or more email or SMS recipients, including, by way of example but not limitation, the workstation 12 and the OMS 102 of the subject tractor 64, which OMS could display the alert on the tractor's dashboard and/or instrument panel (e.g., by illuminating the fuel gauge light).

A Product Configuration form 260, exemplified by FIG. 19, enables a user to configure different product types of fuel sensor 104. This form enables a user to set a product code and description for each product type which is then used to further group and configure individual fuel sensors.

A Firmware Updates form 262, exemplified by FIG. 20, enables firmware updates to fuel sensors to be sent globally to fuel sensors 104.

The help module 234 includes About Us function 264 and a Help Menu function 262 which provide various support to the user. Such functions are considered to be well known in the art and so will not be discussed further herein.

The instant notification module 236 includes Email form 268 and SMS form 270 which enable a user to configure how emails and text messages are sent, preferably in real time. By way of example, but not limitation, such an email to display 13 or text to a cell phone may be sent in step 524 of the process depicted by flow chart 500 of FIG. 5, or when a fuel loss event has been identified.

It should be appreciated that although a particular architecture is shown and described in FIG. 5, other architectures are within the teachings presented herein. By way of example and not limitation, additional modules may be included. For example, a data input configuration module may be included to provide further capabilities to a user to set-up data inputs, which will allow various reconciliations to occur. Various fuel data and purchase data functions may be configured. Specific software handling characteristics such as file handling, parsing, and file formatting may be handled by this module. Mapping functionality may be incorporated into the various modules presented herein such that information is overlaid onto a map.

It can be appreciated that RIMS 16 is able to accumulate substantial data from the system 10 about travel between various routes between points, such as cities. Such data may include vehicle performance, such as average miles/gallon, average speed, and average travel time. Data about the various routes may also include current price/gallon of fuel at various fueling locations. With this data, RIMS 16 may propose an optimized route based on an optimization characteristic or a weighted combination of characteristics, such as length of route, time to travel a route, and the cost and quality of fuel along a respective route, as exemplified below with respect to FIG. 21. Additionally, RIMS data may be used to provide a database of all fuel and travel data from a fleet of tractors. For example, if a user (e.g., an auditor, manager, attorney) needs to research characteristics of a truck at a given point in time, the database could be searched for that information (e.g., fuel level, GPS location, temperature of the fuel, and truck characteristics such as MPG, mileage, and the like). Likewise, the RIMS database also stores all the fuel purchase reconciliation data which may be of use to an auditor who performs quarterly or yearly audits on fuel purchases.

Figure 21:
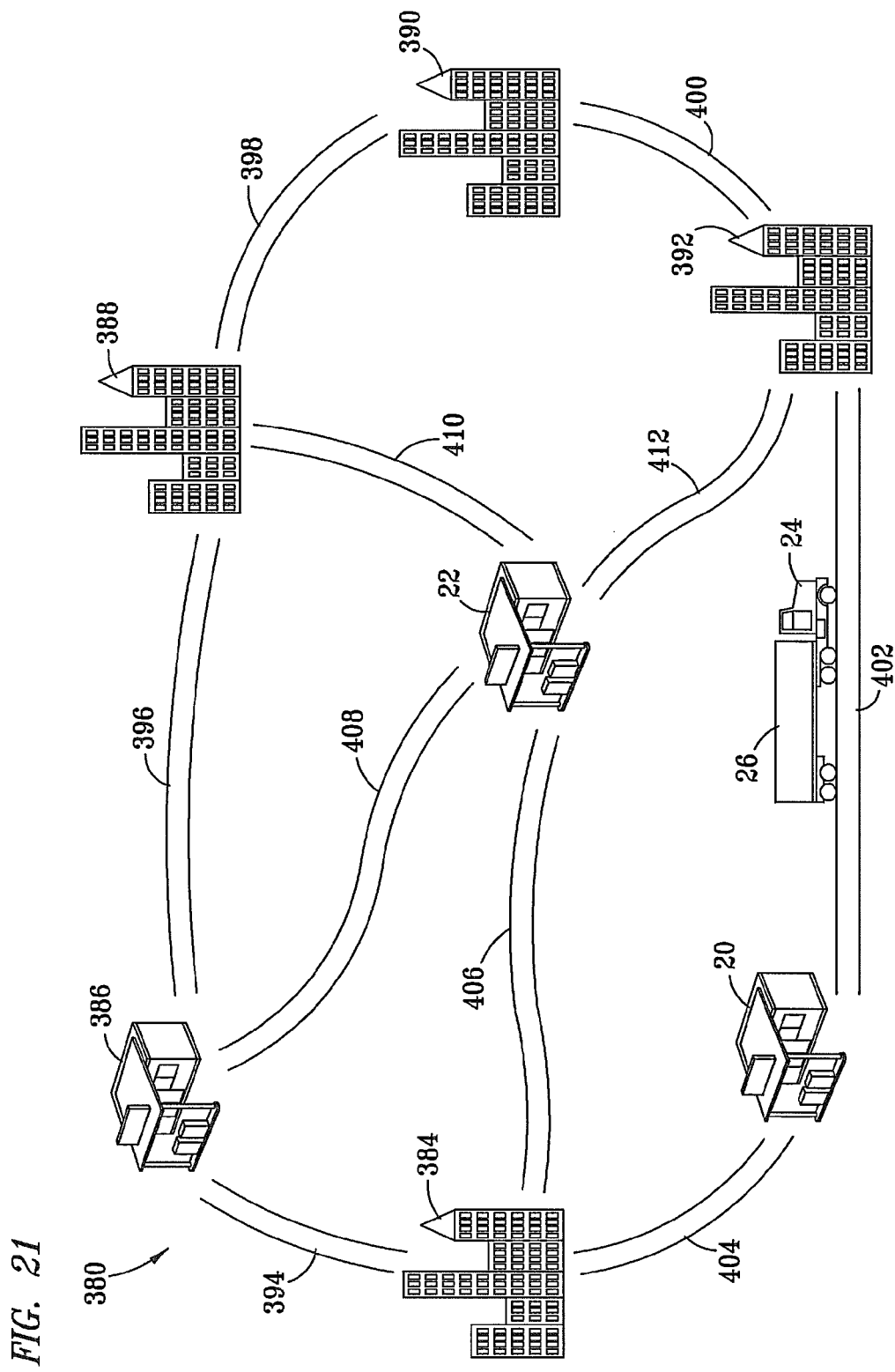
FIG. 21 is a graphical schematic diagram exemplifying one embodiment of fuel optimization application of the system for managing inventory of a consumable.

FIG. 21 exemplifies one scenario of a fuel optimization application of RIMS 16 of system 10. Tractor 24, employing the systems and processes presented herein, is hauling a load 26. As shown, city 384, fueling location 386, city 388, city 390, city 392, fueling location 20, and fueling location 22 are interconnected by highways 394, 396, 398, 400, 402, 404, 406, 408, 410, and 412. The transportation carrier frequently has tractors hauling freight on the route between city 384 and city 390. As a result, RIMS 16 has collected data about the various routes between city 384 and city 390. For example, one route may be city 384, which is the origin, on highway 394 to fueling location 386, on highway 396 to city 388, and on highway 398 to city 390, which is the destination. Another route may be city 384 on highway 404 to fueling location 20 on highway 402 to city 392, and on highway 400 to city 390, which is the destination. Yet another route may be to city 384 on highway 406 to fueling location 22, on highway 412 to city 392, and on highway 400 to city 390. While there are thus a number of routes that could be taken, using data that RIMS 16 has accumulated, an optimized route may be proposed for tractor 24 hauling freight 26 from city 384 to city 390 based, for example, on the price/gallon of fuel or, if the quality of the fuel is known, the price per BTU (British Thermo Unit). Therefore, as shown, tractor 24 utilizes highway 404, fueling location 20, highway 402, and highway 400 to city 390.

FIG. 22 depicts a side view of the tank 64 described above and configured for storing fluid 1001, such as fuel, such as diesel fuel or gasoline. Except as described herein, tank 64 is generally a conventional fuel tank, including a fuel supply line 96 extending from an outlet 98 to an engine (not shown) and, for fuel such as diesel fuel, a fuel return line 94 entering an inlet 92. To the extent that tank 64 is a conventional tank, it will not be described in further detail herein, except to the extent deemed necessary to describe the invention.

As shown by way of a broken-away portion of a side wall of tank 64, an opening 1016 is formed in the top of tank 64. A cylinder 1002 extends through opening 1016. Cylinder 1002 includes a ring plate 1020 configured for extending across opening 1016 and supporting cylinder 1002 in tank 64. Plate 1020 is preferably secured to tank 64 in any conventional manner, such as by fasteners, such as screws and/or bolts, or welding, and preferably with a gasket to act as a seal effective for preventing leakage of fluid 1001 from within the tank. Cylinder 1002 is preferably configured with vent holes 1003 for equalizing pressure between the interior and exterior of tank 64 as fuel volume changes and/or as altitude and atmospheric pressure changes. A tube 1004 extends through cylinder 1002, and sensor 104 is attached to a lower end of the tube to thereby position sensor 104 in fluid 1001.

As shown in FIG. 23, sensor 104 preferably includes electrical circuitry 150 including a processor 152 and a memory 154 effective for storing computer program code executable by processor 152. A bus 160 is provided which couples together processor 152 and memory 154, as well as an input/output ("I/O") 156. Sensor 104 further preferably includes a pressure detector 112 and, optionally, a temperature detector 138, both of which detectors are coupled to processor 152 and memory 154 via I/O 156 and bus 160. Processor 152 is effective for receiving signals from pressure detector 112 and, optionally, temperature detector 138, and generating signals indicative of pressure and temperature, respectively, onto I/O 160, for transmission via respective electrical signal lines 1010 and 1012 to OMS 102, which transmits the signals to RIMS 16 for use in step 506 of the process 500 depicted in FIG. 5. It is noted that the term "sensor" as used herein may comprise a single detector or multiple detectors.

Sensor 104 preferably also includes a vent line 1014, which runs through tube 1004 (FIG. 24) and outside tank 64 to a dry box 1018 for communicating atmospheric pressure to sensor 104, the sensor being configured for adjusting a fluid pressure reading by atmospheric pressure, so that processor 152 can account for the effects of atmospheric pressure on the pressure of fluid 1001 in the tank 64. Dry box 1018 includes desiccant to aid in absorbing moisture and keeping air in vent line 1014 dry so that atmospheric pressure may be accurately communicated. Dry box 1018 may be located in any suitable place that is convenient and protected from water in the environment, such as precipitation (e.g., rain) and water that splashes up from a roadway. Dry box 1018 may, for example, be located in cab 48 and/or integrated with OMS 102 (which may also be located in cab 48).

Sensors that detect pressure and temperature are considered to be well-known and commercially available from manufacturers, and so will not be described in further detail herein, except insofar as necessary to describe the invention.

As shown most clearly in FIG. 24, in a cross-section of tube 1004 taken along line 24-24 of FIG. 22, tube 1004 carries the lines 1010 and 1012 as well as the vent line 1014. As shown in FIG. 22, the tube 1004 extends through cylinder 1002 to the exterior of tank 64. Outside of tank 64, electrical signal lines 1010 and 1012 are preferably carried with the data communication link 120 in any suitable manner, such as by way of split loom tubing, to processor 172 of OMS 102. In one embodiment, depicted by FIG. 22, outside the tank 64, vent line 1014 is separated from tube 120 carrying electrical signal lines 1010 and 1012, and is directed to dry box 1018. In an alternative embodiment, dry box 1018 is integrated with OMS 102 and vent line 1014 is carried by tube 120 with signal lines 1010 and 1012 to dry box 1018 in OMS 102.

Figure 26:
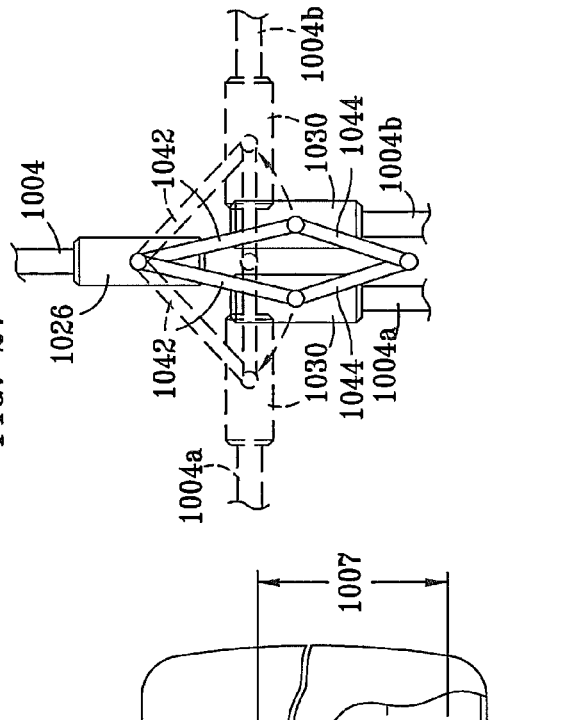
FIG. 26 illustrates the dual fuel volume sensor of FIG. 25 inserted in a fuel tank of the tractor of FIG. 3.

In a preferred embodiment of the invention, a compensatory pressure detector 1005 is positioned above sensor 104 by a space 1007 to more precisely determine density (or an analogue thereof) to thereby obviate errors that may result from a change in density due to, for example, varying grades of fuel, or the effects of temperature on fluid 1001. Additional electrical signal lines 1010 (not shown) are preferably provided from compensatory pressure detector 1005 to processor 152 for processing and then transmission via bus 160 and I/O 156 to OMS 102. Alternatively, additional electrical signal lines 1010 may be provided for carrying signals from detector 1005 in tube 120 to OMS 102. In the preferred embodiment, memory 174 in OMS 102 is preferably provided with computer program code for comparing the pressure measured by pressure detector 112 and the pressure measured by compensatory pressure detector 1005, and determining a difference, or delta pressure. The delta pressure may be used to determine density (or an analogue to density) of fluid 1001, and thereby determine more precisely, with the pressure measured from pressure detector 112, the height of fluid in tank 64, from which height the volume fluid in tank 64 may be determined. In one embodiment of the invention, such calculation may be made using the following variables:

W_comp=compensated liquid weight value per inch of liquid
C_distance=compensation distance setting, designated by reference numeral 1007 in FIGS. 22 and 26.
T_distance=calculated total liquid height in tank.
P_primary=pressure reading from primary sensor, exemplified by sensor 104
P_comp=pressure reading from compensating pressure sensor 1005.

The above variables may then be used in the following equations to calculate T:

W_comp=(P_primary−P_comp)/C_distance
T_distance=P_primary/W_comp

Exemplifying with specific values, such as P_primary=5 psi, P_comp=3 psi, and C_distance=4 inches, then:

W_Comp=5 psi−3 psi/4 inch=0.5 psi per inch
T_distance=5 psi/0.5 psi=10 inches of liquid in the tank.

It is considered that such equations to effectuate such calculations and determinations would be apparent to a person having ordinary skill in the art upon a reading of the present description herein, and so will not be described in further detail herein. The density is preferably calculated only when tank 64 is filled up, and then stored in memory 154 until a subsequent fill-up, thereby avoiding errors in calculations when the level of fluid falls below the level of the compensatory pressure detector 1005.

It may be appreciated that fluid 1001 in a moving tractor 24 will slosh around, vibrate, and move from one end of tank 64 to the other as the angle of the tractor changes, such as when traveling up or down an incline, such as a hill. As fluid 1001 moves, the pressure sensed by pressure detector 112 may change, potentially resulting in erroneous measurements. To obtain a more accurate measurement, the pressure is preferably measured frequently (e.g., every 30 seconds) and a rolling average is generated, representing a more accurate measurement of fluid pressure and, hence, fluid volume, as discussed above with respect to steps 506-510 of the flow chart 500 of FIG. 5.

To obtain further enhanced accuracy of fluid pressure and volume, particularly when fluid shifts from one end of tank 64 to the other, in an alternative embodiment of the invention, multiple pressure sensors are used proximate to the bottom of tank 64, and measurements from the multiple pressure sensors are averaged. Accordingly, FIG. 25 exemplifies an alternative embodiment of the invention in which two pressure sensors proximate to the bottom of the tank 64 are utilized, preferably in addition to the compensatory pressure detector 1005, described above. In addition to pressure sensor 104, an additional sensor 1006 is utilized to measure fluid pressure, and hence, volume, more accurately. Sensor 1006 includes a pressure detector 1007 preferably substantially similar to pressure detector 112, and includes circuitry similar to circuitry 150 of FIG. 23. It is not necessary that sensor 1006 be provided with a temperature detector as the sensor 104 was optionally provided with the a temperature detector 138. Pressure detector 1007 is preferably coupled to a processor via lines running through I/O and a bus, and then onto an additional set of electrical signal lines 1010 to OMS 102. In an alternative embodiment, all electrical signals indicative of pressure and/or temperature are combined by a single processor and transmitted via a single pair of lines to OMS 102 using conventional serial communication technology, as is well known in the art.

Further to the embodiment of FIG. 25, tube 1004 is replaced by an upper tube 1024, a splitter 1026, and two tubes 1004a and 1004b, with reinforcing tubing 1030, terminating in sensors 104 and 1006, respectively. Tubes 1004a and 1004b are preferably of dissimilar lengths so that sensors 104 and 1006, when together as shown in FIG. 25, maintain a smaller lateral (or horizontal) profile so that they may be passed more readily through opening 1016. A spring 1052 is preferably positioned on the two tubes 1004a and 1004b for spreading the two tubes apart, preferably by an angle of about 180°, as more clearly depicted in FIG. 26. In operation, when pressure measurements are desired, fluid pressure is measured from both pressure detectors 112 and 1007 and preferably averaged, and the average value is used, for example, in step 508 of FIG. 5, as well as in determining the density of the fluid 1001 in conjunction with the compensatory pressure detector, as discussed above. Operation of the embodiment of FIGS. 25-26 is otherwise similar to operation of the embodiment of FIGS. 22-24.

Figure 27:
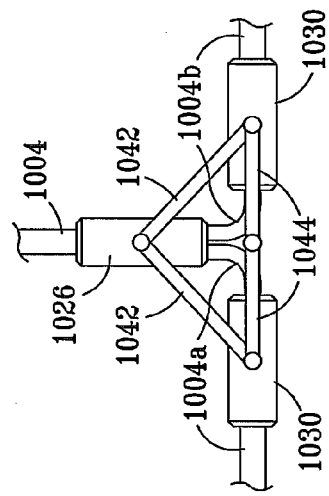
FIGS. 27 and 28 exemplify a mechanism that may optionally be employed to stabilize the dual fuel volume sensor of FIG. 25.
Figure 28:
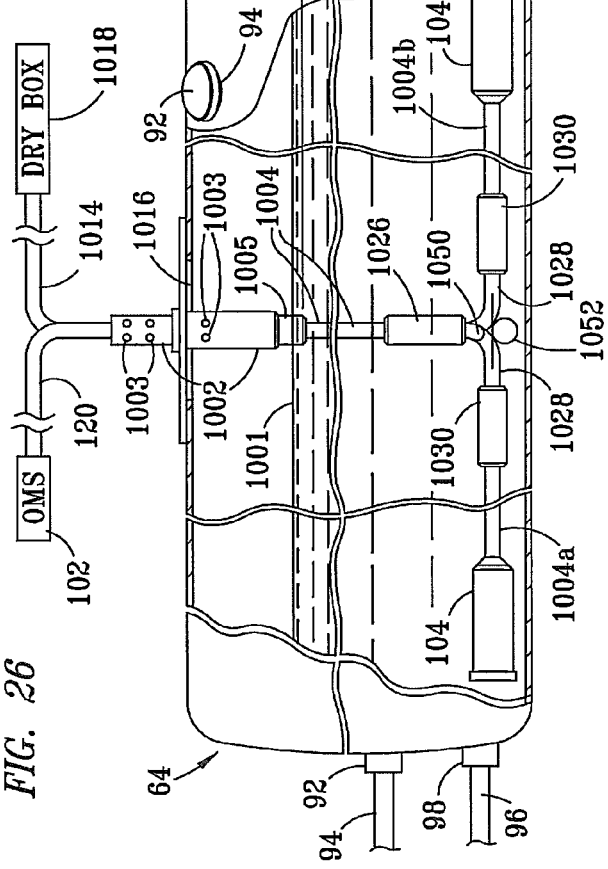

It may be appreciated that when tubes 1004a and 1004b, as well as sensors 104 and 1006, are spread apart, it would be desirable that they maintain a relatively constant position and orientation with respect to each other, to facilitate consistently accurate and reliable fluid pressure measurements. To that end, FIGS. 27 and 28 exemplify a sub-assembly of linkages 1042 and 1044 which are preferably adapted to the embodiment of FIGS. 25 and 26, pivoting on the splitter 1026 and each of reinforcing tubes 1030. FIG. 27 demonstrates how tubes 1004a and 1004b are substantially parallel, in solid outline, and move to a spread position in which tubes 1004a and 1004b are substantially collinear, in dashed outline. The latter position is shown in solid outline in FIG. 28.

It may be further appreciated that by knowing the depth (or height) of fluid 1001 in a tank 64, and the size and shape of a tank, the volume may be calculated in any of a number of different ways by OMS 102 processor 172, RIMS 16 processor 202, or any other suitable processor. By way of example but not limitation, the sensor 104 pressure output allows fluid volume to be calculated mathematically using well-known equations, given the size and shape of a tank for a given fluid depth. In another example, fluid volume may be calculated mathematically for a number of different fluid heights and a chart generated correlating height to volume; then a specific volume may be determined from the chart for any specific depth. In another example, volume may be determined by manually pouring fluid into a tank, one unit (e.g., gallon) at a time, and measuring the pressure or depth with each unit added and generate a chart from that. In another example, if tanks can be categorized into a few fundamental shapes, the only variable being size, a chart may be generated for each category of shape, and scaled for the size of any particular tank of that shape. Volume may also be scaled or adjusted for the density and/or temperature (which affects density) of the fluid. It is considered that further details exemplifying such methods, as well as alternative methods, for determining volume of a fluid from variables, such as pressure or depth of the fluid in a tank and density of the fluid, would be apparent to a person having ordinary skill in the art, upon a reading of the description of the invention herein; therefore, it is deemed not necessary to discuss same in further detail herein.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for determining volume of fluid in at least one tank, the system comprising:
   at least one tank mounted on a vehicle, the at least one tank being capable of storing a volume of fluid;
   at least one sensor positioned within the at least one tank, and submersed in fluid when fluid is in the at least one tank, the at least one sensor being configured for measuring pressure of fluid proximate to the bottom of the at least one tank;
   at least one vent line operably connected to the at least one sensor, the at least one vent line having a single end through which air may flow and atmospheric pressure may be communicated to the at least one sensor, the at least one sensor being further configured for adjusting a fluid pressure reading by the communicated atmospheric pressure;
   a first at least one processor positioned within the at least one sensor, and a first at least one memory coupled to the first at least one processor, the first at least one memory including computer program code executable by the first at least one processor for generating pressure signals indicative of fluid pressure adjusted by atmospheric pressure; and
   means for determining the volume of fluid from the pressure signals.

2. The system of claim 1 wherein the at least one sensor is also configured for measuring temperature of the fluid and generating a signal indicative of the temperature to ascertain whether fuel frost or freeze event could occur.

3. The system of claim 1 wherein the means comprises:
   a second processor coupled to the at least one sensor; and
   a second memory coupled to the second processor, the second memory including computer program code executable by the second processor for determining the volume of fluid with reference to the pressure and density of the fluid and the size and shape of the at least one tank.

4. The system of claim 1 further comprising:
   a transmitter mounted on the vehicle configured for transmitting data signals to a remote inventory management server (RIMS);
   a second processor coupled to the at least one sensor and the transmitter; and
   a second memory coupled to the second processor, the second memory including computer program code executable by the second processor for:
      determining the volume of fluid with reference to the pressure and the density of the fluid; and
      causing the transmitter to transmit data signals indicative of the volume of fluid to the RIMS, the RIMS being configured for receiving and processing the data signals.

5. The system of claim 1 further comprising:
   a transmitter configured for transmitting data signals to a remote inventory management server (RIMS);
   a second processor coupled to the at least one sensor and the transmitter; and
   a second memory coupled to the second processor, the second memory including computer program code executable by the second processor for:
      determining the volume of fluid with reference to the pressure and the density of the fluid; and
      causing the transmitter to transmit data signals indicative of the volume of fluid to the RIMS, the RIMS including a third processor and third memory coupled to the third processor, the third memory including computer program code executable by the third processor for determining if fuel volume has increased more than a predetermined threshold and for generating an alert if it is determined that fuel volume has increased more than a predetermined threshold.

6. The system of claim 1 further comprising:
   a transmitter configured for transmitting data signals to a remote inventory management server (RIMS);
   a second processor coupled to the first at least one sensor and the transmitter; and
   a second memory coupled to the second processor, the second memory including computer program code executable by the second processor for:
      determining the volume of fluid with reference to the pressure and the density of the fluid; and
      causing the transmitter to transmit data signals indicative of the volume of fluid to the RIMS, the RIMS including third processor and third memory coupled to the third processor, the third memory including computer program code executable by the third processor for determining if fuel volume has decreased more than a predetermined threshold and for generating an alert if it is determined that fuel volume has decreased more than a predetermined threshold.

7. The system of claim 1 further comprising:
a transmitter configured for transmitting data signals to a remote inventory management server (RIMS);
a second processor coupled to the first at least one sensor and the transmitter; and
a second memory coupled to the second processor, the second memory including computer program code executable by the second processor for:
determining the volume of fluid with reference to the pressure and the density of the fluid and the size and shape of the at least one tank; and
causing the transmitter to transmit data signals indicative of the volume of fluid to the RIMS, the RIMS including a third processor and third memory coupled to the third processor, the third memory including computer program code executable by the third processor for determining if fuel volume has increased more than a predetermined threshold and for recording the volume subsequent to the increase if it is determined that fuel volume has increased more than a predetermined threshold.

8. The system of claim 1 wherein the at least one sensor is a first at least one sensor and the system further comprises:
a second at least one sensor positioned proximate to the bottom of the at least one tank and spaced apart from the first at least one sensor, the second at least one sensor being configured for measuring the pressure of the fluid;
a second processor coupled to the at least one sensor and the transmitter; and
a second memory coupled to the second processor, the second memory including computer program code executable by the second processor for:
determining an average pressure equal to an average of the pressure sensed by the first at least one sensor and the pressure sensed by the second at least one sensor; and
determining the volume of fluid with reference to the average pressure and the density of the fluid.

9. The system of claim 1 wherein the at least one sensor is a first at least one sensor and the system further comprises:
a second at least one sensor positioned proximate to the bottom of the at least one tank and spaced apart from the first at least one sensor, the second at least one sensor being configured for measuring the pressure of the fluid; and
a transmitter configured for transmitting data signals to a remote inventory management server (RIMS);
a second processor coupled to the at least one sensor and the transmitter; and
a second memory coupled to the second processor, the second memory including computer program code executable by the second processor for:
determining an average pressure by averaging the pressure sensed by the first at least one sensor and the pressure sensed by the second at least one sensor;
determining the volume of fluid with reference to the average pressure and the density of the fluid and the size and shape of the at least one tank; and
causing the transmitter to transmit data signals indicative of the average pressure to the RIMS, the RIMS including a third processor and third memory coupled to the third processor, the third memory including computer program code executable by the third processor for determining if fuel volume has increased more than a predetermined threshold and, if it has, for recording the volume subsequent to the increase and comparing the volume with a volume indicated on a bank charge card to identify discrepancies between the volume calculated and the volume purchased.

10. The system of claim 1 wherein the at least one sensor is a first at least one sensor and the system further comprises:
a second at least one sensor positioned higher in the at least one tank by a predetermined space than the first at least one sensor, the second at least one sensor being configured for measuring the pressure of the fluid;
a second processor coupled to the first at least one sensor and the second at least one sensor; and
a second memory coupled to the second processor, the second memory including computer program code executable by the second processor for:
determining the density of the fluid with reference to the pressure measured by the first at least one sensor and the pressure measured by the second at least one sensor; and
determining the volume of fluid with reference to the pressure measured by the first at least one sensor and the determined density of the fluid.

11. The system of claim 1 wherein the at least one sensor is a first at least one sensor and the system further comprises:
a second at least one sensor positioned proximate to the bottom of the at least one tank and spaced apart from the first at least one sensor, the second at least one sensor being configured for measuring the pressure of the fluid;
a third at least one sensor positioned higher in the at least one tank by a predetermined space than the first and second at least one sensors, the third at least one sensor being configured for measuring the pressure of the fluid;
a second processor coupled to the first at least one sensor and the second at least one sensor; and
a second memory coupled to the second processor, the second memory including computer program code executable by the second processor for:
determining an average pressure equal to an average of the pressure sensed by the first at least one sensor and the pressure sensed by the second at least one sensor;
determining the density of the fluid with reference to the average pressure and the pressure measured by the third at least one sensor; and
determining the volume of fluid with reference to the average pressure and the determined density of the fluid and the size and shape of the at least one tank.

12. A system for determining volume of fluid in at least one tank, the system comprising:
at least one tank capable of storing a volume of fluid;
at least one sensor positioned within the at least one tank, and submersed in fluid when fluid is in the at least one tank, the at least one sensor being configured for measuring pressure of fluid proximate to the bottom of the at least one tank and for adjusting a measurement of fluid pressure by atmospheric pressure;
a first at least one processor positioned within the at least one sensor, and a first at least one memory coupled to the first at least one processor, the first at least one memory including computer program code executable by the first at least one processor for generating pressure signals indicative of fluid pressure adjusted by atmospheric pressure; and
means for determining the volume of fluid from the pressure signals.

13. The system of claim 12 wherein the at least one sensor is also configured for measuring temperature of the fluid and generating a signal indicative of the temperature to ascertain whether fuel frost or freeze event could occur.

14. The system of claim 12 wherein the means comprises:
a second processor coupled to the at least one sensor; and
a second memory coupled to the second processor, the second memory including computer program code executable by the second processor for determining the volume of fluid with reference to the pressure and density of the fluid and the size and shape of the at least one tank.

15. The system of claim 12 further comprising:
a transmitter mounted on the vehicle configured for transmitting data signals to a remote inventory management server (RIMS);
a second processor coupled to the at least one sensor and the transmitter; and
a second memory coupled to the second processor, the second memory including computer program code executable by the second processor for:
determining the volume of fluid with reference to the pressure and the density of the fluid; and
causing the transmitter to transmit data signals indicative of the volume of fluid to the RIMS, the RIMS being configured for receiving and processing the data signals.

16. The system of claim 12 further comprising:
a transmitter configured for transmitting data signals to a remote inventory management server (RIMS);
a second processor coupled to the at least one sensor and the transmitter; and
a second memory coupled to the second processor, the second memory including computer program code executable by the second processor for:
determining the volume of fluid with reference to the pressure and the density of the fluid; and
causing the transmitter to transmit data signals indicative of the volume of fluid to the RIMS, the RIMS including a third processor and third memory coupled to the third processor, the third memory including computer program code executable by the third processor for determining if fuel volume has increased more than a predetermined threshold and for generating an alert if it is determined that fuel volume has increased more than a predetermined threshold.

17. The system of claim 12 further comprising:
a transmitter configured for transmitting data signals to a remote inventory management server (RIMS);
a second processor coupled to the first at least one sensor and the transmitter; and
a second memory coupled to the second processor, the second memory including computer program code executable by the second processor for:
determining the volume of fluid with reference to the pressure and the density of the fluid; and
causing the transmitter to transmit data signals indicative of the volume of fluid to the RIMS, the RIMS including a third processor and third memory coupled to the third processor, the third memory including computer program code executable by the third processor for determining if fuel volume has decreased more than a predetermined threshold and for generating an alert if it is determined that fuel volume has decreased more than a predetermined threshold.

18. The system of claim 12 further comprising:
a transmitter configured for transmitting data signals to a remote inventory management server (RIMS);
a second processor coupled to the first at least one sensor and the transmitter; and
a second memory coupled to the second processor, the second memory including computer program code executable by the second processor for:
determining the volume of fluid with reference to the pressure and the density of the fluid and the size and shape of the at least one tank; and
causing the transmitter to transmit data signals indicative of the volume of fluid to the RIMS, the RIMS including a third processor and third memory coupled to the third processor, the third memory including computer program code executable by the third processor for determining if fuel volume has increased more than a predetermined threshold and for recording the volume subsequent to the increase if it is determined that fuel volume has increased more than a predetermined threshold.

19. The system of claim 12 wherein the at least one sensor is a first at least one sensor and the system further comprises:
a second at least one sensor positioned proximate to the bottom of the at least one tank and spaced apart from the first at least one sensor, the second at least one sensor being configured for measuring the pressure of the fluid;
a second processor coupled to the at least one sensor and the transmitter; and
a second memory coupled to the second processor, the second memory including computer program code executable by the second processor for:
determining an average pressure equal to an average of the pressure sensed by the first at least one sensor and the pressure sensed by the second at least one sensor; and
determining the volume of fluid with reference to the average pressure and the density of the fluid.

20. The system of claim 12 wherein the at least one sensor is a first at least one sensor and the system further comprises:
a second at least one sensor positioned proximate to the bottom of the at least one tank and spaced apart from the first at least one sensor, the second at least one sensor being configured for measuring the pressure of the fluid; and
a transmitter configured for transmitting data signals to a remote inventory management server (RIMS);
a second processor coupled to the at least one sensor and the transmitter; and
a second memory coupled to the second processor, the second memory including computer program code executable by the second processor for:
determining an average pressure by averaging the pressure sensed by the first at least one sensor and the pressure sensed by the second at least one sensor;
determining the volume of fluid with reference to the average pressure and the density of the fluid and the size and shape of the at least one tank; and
causing the transmitter to transmit data signals indicative of the average pressure to the RIMS, the RIMS including a third processor and third memory coupled to the third processor, the third memory including computer program code executable by the third processor for determining if fuel volume has increased more than a predetermined threshold and, if it has, for recording the volume subsequent to the increase and comparing the volume with a volume indicated on a bank charge card to identify discrepancies between the volume calculated and the volume purchased.

21. The system of claim 12 wherein the at least one sensor is a first at least one sensor and the system further comprises:
a second at least one sensor positioned higher in the at least one tank by a predetermined space than the first at least one sensor, the second at least one sensor being configured for measuring the pressure of the fluid; and
a second processor coupled to the first at least one sensor and the second at least one sensor; and
a second memory coupled to the second processor, the second memory including computer program code executable by the second processor for:
determining the density of the fluid with reference to the pressure measured by the first at least one sensor and the pressure measured by the second at least one sensor; and
determining the volume of fluid with reference to the pressure measured by the first at least one sensor and the determined density of the fluid.

22. The system of claim 12 wherein the at least one sensor is a first at least one sensor and the system further comprises:
a second at least one sensor positioned proximate to the bottom of the at least one tank and spaced apart from the first at least one sensor, the second at least one sensor being configured for measuring the pressure of the fluid;
a third at least one sensor positioned higher in the at least one tank by a predetermined space than the first and second at least one sensors, the third at least one sensor being configured for measuring the pressure of the fluid; and
a second processor coupled to the first at least one sensor and the second at least one sensor; and
a second memory coupled to the second processor, the second memory including computer program code executable by the second processor for:
determining an average pressure equal to an average of the pressure sensed by the first at least one sensor and the pressure sensed by the second at least one sensor; and
determining the density of the fluid with reference to the average pressure and the pressure measured by the third at least one sensor; and
determining the volume of fluid with reference to the average pressure and the determined density of the fluid and the size and shape of the at least one tank.

23. The system of claim 12 further comprising a dry box attached the at least one vent line to aid in absorbing moisture and keeping air in the at least one vent line dry.

24. The system of claim 12 further comprising a dry box coupled in fluid communication to the at least one sensor to aid in absorbing moisture and keeping air communicated to the at least one sensor dry.

25. A system for determining volume of fluid in at least one tank, the system comprising:
at least one tank mounted on a vehicle, the at least one tank being capable of storing a volume of fluid;
at least one sensor positioned within the at least one tank, and submersed in fluid when fluid is in the at least one tank, the at least one sensor being configured for measuring pressure of fluid proximate to the bottom of the at least one tank;
at least one vent line operably connected to the at least one sensor, the at least one vent line having a single end through which air may flow and atmospheric pressure may be communicated to the at least one sensor, the at least one sensor being further configured for adjusting a fluid pressure reading by the communicated atmospheric pressure;
a dry box attached the at least one vent line to aid in absorbing moisture and keeping air in the at least one vent line dry;
a first processor positioned within and coupled to the at least one sensor; and
a first memory positioned within the at least one sensor and coupled to the first processor, the first memory including computer program code executable by the first processor for determining volume of fluid with reference to the pressure of fluid as adjusted by atmospheric pressure, the density of the fluid, and the size and shape of the at least one tank.

26. The system of claim 25 wherein the at least one sensor is a first at least one sensor and the system further comprises:
a second at least one sensor positioned proximate to the bottom of the at least one tank and spaced apart from the first at least one sensor, the second at least one sensor being configured for measuring the pressure of the fluid;
a second processor coupled to the at least one sensor and the transmitter; and
a second memory coupled to the second processor, the second memory including computer program code executable by the second processor for:
determining an average pressure equal to an average of the pressure sensed by the first at least one sensor and the pressure sensed by the second at least one sensor; and
determining the volume of fluid with reference to the average pressure and the density of the fluid.

27. The system of claim 25 wherein the at least one sensor is a first at least one sensor and the system further comprises:
a second at least one sensor positioned proximate to the bottom of the at least one tank and spaced apart from the first at least one sensor, the second at least one sensor being configured for measuring the pressure of the fluid; and
a transmitter configured for transmitting data signals to a remote inventory management server (RIMS);
a second processor coupled to the at least one sensor and the transmitter; and
a second memory coupled to the second processor, the second memory including computer program code executable by the second processor for:
determining an average pressure by averaging the pressure sensed by the first at least one sensor and the pressure sensed by the second at least one sensor;
determining the volume of fluid with reference to the average pressure and the density of the fluid and the size and shape of the at least one tank; and
causing the transmitter to transmit data signals indicative of the average pressure to the RIMS, the RIMS including a third processor and third memory coupled to the third processor, the third memory including computer program code executable by the third processor for determining if fuel volume has increased more than a predetermined threshold and, if it has, for recording the volume subsequent to the increase and comparing the volume with a volume indicated on a bank charge card to identify discrepancies between the volume calculated and the volume indicated on a bank charge card as being purchased for insertion in the at least one tank.

28. The system of claim 25 wherein the at least one sensor is a first at least one sensor and the system further comprises:
a second at least one sensor positioned higher in the at least one tank by a predetermined space than the first at least one sensor, the second at least one sensor being configured for measuring the pressure of the fluid; and
a second processor coupled to the first at least one sensor and the second at least one sensor; and
a second memory coupled to the second processor, the second memory including computer program code executable by the second processor for:
determining the density of the fluid with reference to the pressure measured by the first at least one sensor and the pressure measured by the second at least one sensor; and
determining the volume of fluid with reference to the pressure measured by the first at least one sensor and the determined density of the fluid.

29. The system of claim 25 wherein the at least one sensor is a first at least one sensor and the system further comprises:
a second at least one sensor positioned proximate to the bottom of the at least one tank and spaced apart from the first at least one sensor, the second at least one sensor being configured for measuring the pressure of the fluid;
a third at least one sensor positioned higher in the at least one tank by a predetermined space than the first and second at least one sensors, the third at least one sensor being configured for measuring the pressure of the fluid; and
a second processor coupled to the first at least one sensor and the second at least one sensor; and
a second memory coupled to the second processor, the second memory including computer program code executable by the second processor for:
determining an average pressure equal to an average of the pressure sensed by the first at least one sensor and the pressure sensed by the second at least one sensor;
determining the density of the fluid with reference to the average pressure and the pressure measured by the third at least one sensor; and
determining the volume of fluid with reference to the average pressure and the determined density of the fluid and the size and shape of the at least one tank.

30. The system of claim 25 wherein the fluid is fuel, and the system further comprises at least one fuel quality sensor coupled to the second processor, the at least one fuel quality sensor being configured to measure the quality of fuel in the at least one tank.

* * * * *